US012014038B2

(12) United States Patent
Kosaka et al.

(10) Patent No.: US 12,014,038 B2
(45) Date of Patent: Jun. 18, 2024

(54) STORAGE MEDIUM STORING EDITING PROGRAM AND INFORMATION PROCESSING APPARATUS

(71) Applicant: Brother Kogyo Kabushiki Kaisha, Nagoya (JP)

(72) Inventors: Raizo Kosaka, Nagoya (JP); Yasuhiro Kudo, Ichinomiya (JP); Takeshi Shiotani, Nagoya (JP); Emi Kawaguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/931,781

(22) Filed: Sep. 13, 2022

(65) Prior Publication Data
US 2023/0012060 A1 Jan. 12, 2023

Related U.S. Application Data

(63) Continuation of application No. PCT/JP2021/010044, filed on Mar. 12, 2021.

(30) Foreign Application Priority Data

May 8, 2020 (JP) ................................ 2020-082455

(51) Int. Cl.
*G06F 3/048* (2013.01)
*G06F 3/04845* (2022.01)
(Continued)

(52) U.S. Cl.
CPC ............ *G06F 3/04845* (2013.01); *G06T 7/70* (2017.01); *G06V 30/24* (2022.01)

(58) Field of Classification Search
CPC ........ G06F 3/04845; G06T 7/70; G06V 30/24
See application file for complete search history.

(56) References Cited

U.S. PATENT DOCUMENTS 5,864,636 A * 1/1999 Chisaka ............... G06V 30/347
382/315
6,891,971 B2 * 5/2005 Loudon .................. G06V 30/36
382/187
(Continued)

FOREIGN PATENT DOCUMENTS

CN 102214043 A * 10/2011
JP H08-123907 A 5/1996
(Continued)

OTHER PUBLICATIONS

Zhang et al., SMARTSO: Chinese Character and Stroke Order Recognition With Smartwatch, 2021, IEEE, 15 pages.*
(Continued)

*Primary Examiner* — Linh K Pham
(74) *Attorney, Agent, or Firm* — Banner & Witcoff, Ltd.

(57) ABSTRACT

A non-transitory computer-readable storage medium stores an editing program including a set of program instructions for an information processing apparatus comprising a controller and an input interface. The set of program instructions, when executed by the controller, causes the information processing apparatus to perform: acquiring a plurality of strokes inputted via the input interface; calculating a distance between two strokes of the acquired plurality of strokes; in response to determining that the calculated distance is shorter than a distance threshold, recognizing the two strokes as a same item; in response to determining that the calculated distance is longer than or equal to the distance threshold, recognizing the two strokes as separate items; and changing the distance threshold based on input via the input interface.

16 Claims, 19 Drawing Sheets

(51) Int. Cl.
*G06T 7/70* (2017.01)
*G06V 30/24* (2022.01)

(56) References Cited

U.S. PATENT DOCUMENTS

| | | | | |
|---|---|---|---|---|
| 8,917,298 B2* | 12/2014 | Hasegawa | ............ | B41J 2/32 |
| | | | | 347/171 |
| 10,778,928 B2* | 9/2020 | Li | ............ | G06F 3/0304 |
| 2003/0177289 A1* | 9/2003 | Wakatsuki | ............ | G06F 3/0237 |
| | | | | 710/1 |
| 2010/0039916 A1* | 2/2010 | Hasegawa | ............ | G06K 15/1835 |
| 2010/0289866 A1* | 11/2010 | Hasegawa | ............ | G06K 15/128 |
| | | | | 358/1.9 |
| 2013/0242021 A1* | 9/2013 | Hasegawa | ............ | B41J 2/32 |
| | | | | 347/171 |
| 2014/0145928 A1 | 5/2014 | Demiya | | |
| 2014/0365949 A1* | 12/2014 | Xia | ............ | G06F 3/0482 |
| | | | | 715/780 |
| 2015/0193141 A1* | 7/2015 | Goldsmith | ............ | G06V 30/1423 |
| | | | | 345/173 |
| 2016/0063240 A1* | 3/2016 | Song | ............ | G06F 21/32 |
| | | | | 726/6 |
| 2016/0117548 A1* | 4/2016 | Hirakawa | ............ | G06V 30/40 |
| | | | | 382/187 |
| 2020/0356254 A1* | 11/2020 | Missig | ............ | G06V 30/333 |
| 2021/0124481 A1* | 4/2021 | Taneko | ............ | G06F 3/0414 |
| 2021/0303836 A1* | 9/2021 | Kasatani | ............ | G06F 3/04842 |

FOREIGN PATENT DOCUMENTS

| | | | | | |
|---|---|---|---|---|---|
| JP | H10-302025 | A | | 11/1998 | |
| JP | H11-126235 | A | | 5/1999 | |
| JP | 2008015929 | A | * | 1/2008 | ......... G06F 3/04883 |
| JP | 2012079279 | A | * | 4/2012 | ......... G06F 3/04883 |
| JP | 2014067285 | A | * | 4/2014 | |
| JP | 2015-038670 | A | | 2/2015 | |
| JP | 2015153249 | A | * | 8/2015 | ......... G06F 3/04883 |
| JP | 2015181065 | A | * | 10/2015 | |
| JP | 2016085512 | A | * | 5/2016 | ......... G06K 9/00442 |
| JP | 6073466 | B2 | * | 2/2017 | ........... G06F 3/0416 |
| JP | 6802876 | B2 | * | 12/2020 | ....... G05B 19/41805 |
| WO | WO-2009145589 | A2 | * | 12/2009 | ......... G06K 9/00872 |

OTHER PUBLICATIONS

Thomas Breuel, Segmentation of Handprinted Letter Strings, using a Dynamic Programming Algorithm, 2001, IEEE, 6 pages. (Year: 2001).*

Nov. 8, 2022—International Preliminary Report on Patentability—Intl App PCT/2021/010044.

May 25, 2021—International Search Report—Intl App PCT/2021/010044.

Mar. 12, 2024—(JP) Office Action—JP App 2020-082455, Eng Tran.

* cited by examiner

PAGE MAGNIFICATION = 100%

PAGE MAGNIFICATION = 50%

CPU INTERNAL PROCESSING (PAGE MAGNIFICATION = 100%)

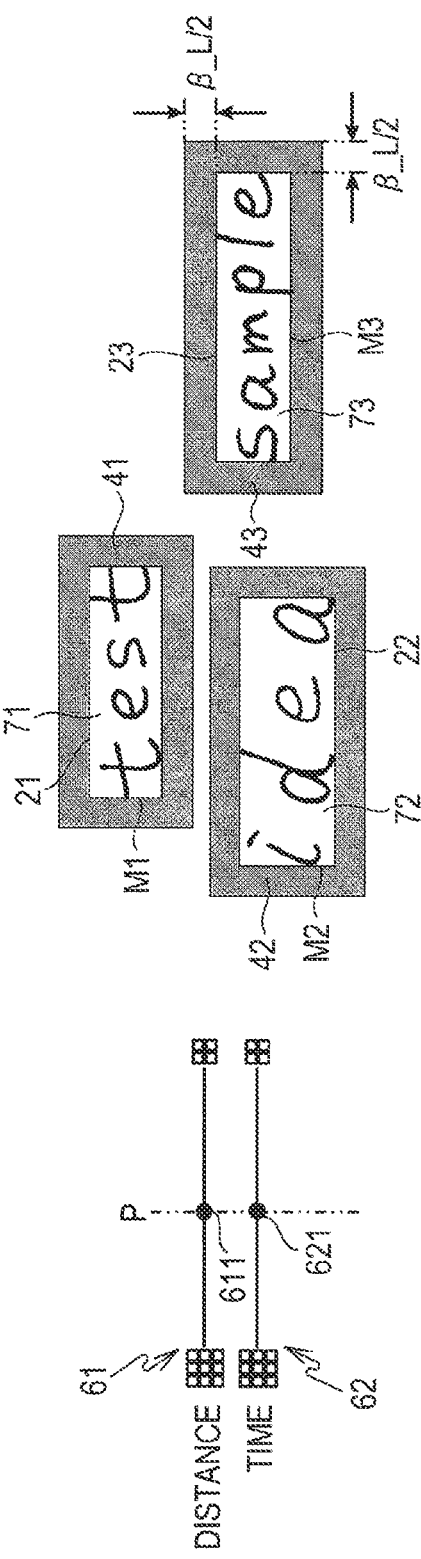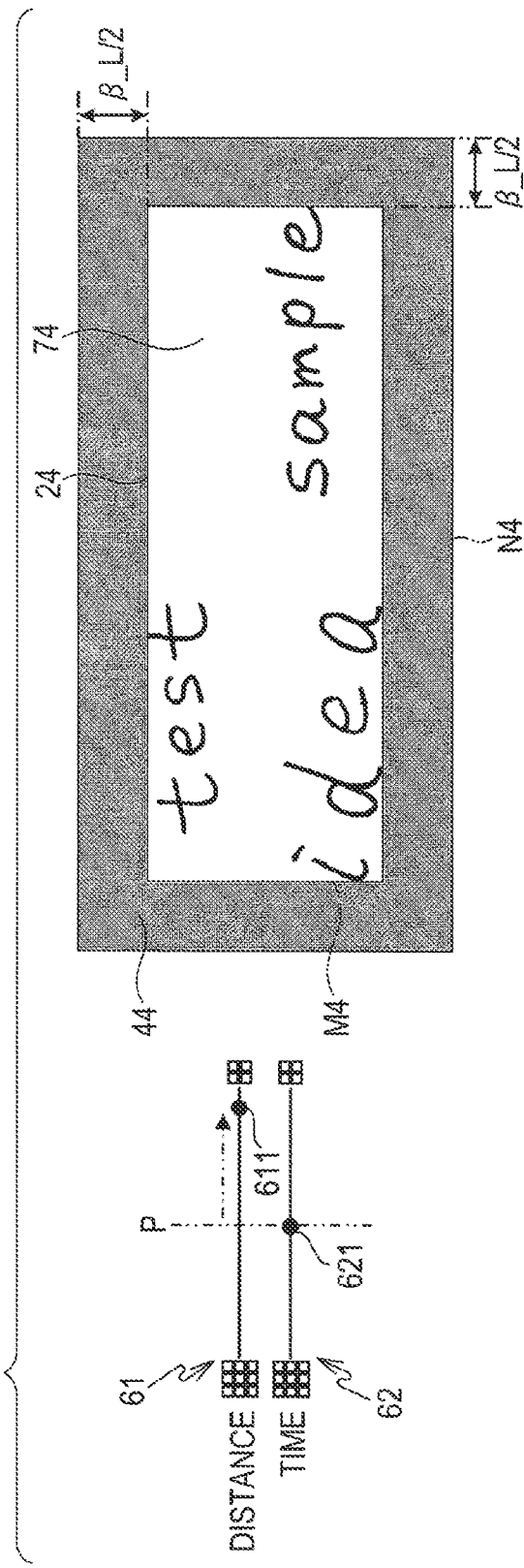

STORAGE MEDIUM STORING EDITING PROGRAM AND INFORMATION PROCESSING APPARATUS

REFERENCE TO RELATED APPLICATIONS

This is a Continuation Application of International Application No. PCT/JP2021/010044 filed on Mar. 12, 2021, which claims priority from Japanese Patent Application No. 2020-082455 filed on May 8, 2020. The entire content of each of the prior applications is incorporated herein by reference.

BACKGROUND ART

A character recognition apparatus recognizes characters that are handwritten on a tablet by a pen.

DESCRIPTION

It is considered whether a plurality of strokes inputted in handwriting are recognized as the same item or different items depends on the distance between strokes or the time in which a plurality of strokes are inputted. A handwritten character recognition apparatus includes a pattern cutout means. The pattern cutout means cuts out a handwritten character string pattern into a plurality of types based on a plurality of predetermined thresholds. The plurality of thresholds are thresholds for determining whether it is a border between characters according to the width of a pattern portion constituting a handwritten character string pattern.

A handwritten character processing apparatus is configured to, when a user inputs a character to a tablet with a pen, detect an off-stroke operation from a pen-up position to a pen-down position and measures an off-stroke distance and an off time. The CPU calculates a determination value for each off stroke based on the measured off-stroke distance and off time. The determination value is a value for determining whether the measured off stroke is an off stroke between characters or an off-stroke between strokes. The CPU refers to each calculated determination value, and determines the off stroke between characters as a character cutout position.

For example, if the distance between two strokes is greater than a threshold, the two strokes are recognized as separate items, and if the distance between two strokes is less than or equal to the threshold, the two strokes are recognized as one item. However, since a plurality of strokes are inputted in handwriting, there are variations in the distance between strokes. Thus, a plurality of strokes are sometimes recognized as one item and sometimes recognized as a plurality of items, which may differ from the user's intention. Further, there are variations among users in the time in which strokes are inputted, and thus there is a problem similar to the distance.

In view of the foregoing, an example of an object of this disclosure is to provide an editing program in which a threshold is easily changeable such that a stroke is included in an item according to a user's intention. According to one aspect, this specification discloses a non-transitory computer-readable storage medium storing an editing program including a set of program instructions for an information processing apparatus comprising a controller and an input interface. By executing the set of program instructions, the controller acquires a plurality of strokes inputted via the input interface. The controller calculates a distance between two strokes of the acquired plurality of strokes. In response to determining that the calculated distance is shorter than a distance threshold, the controller recognizes the two strokes as a same item. In response to determining that the calculated distance is longer than or equal to the distance threshold, the controller recognizes the two strokes as separate items. The controller changes the distance threshold based on input via the input interface. Thus, even if recognition of the item of two strokes is performed against the user's intention, the user is allowed to easily change the distance threshold by operating the input interface. Thus, recognition of the item is performed according to the user's intention.

According to another aspect, this specification also discloses an information processing apparatus. The information processing apparatus includes an input interface and a controller. The controller is configured to: acquire a plurality of strokes inputted via the input interface; calculate a distance between two strokes of the acquired plurality of strokes; in response to determining that the calculated distance is shorter than a distance threshold, recognize the two strokes as a same item; in response to determining that the calculated distance is longer than or equal to the distance threshold, recognize the two strokes as separate items; and change the distance threshold based on input via the input interface.

FIG. 16A is a diagram showing a state where item regions 71 to 73 are displayed.

FIG. 16B is a diagram showing a state where a distance threshold is increased by a slider 611 from a state of FIG. 16A.

Figure 23:
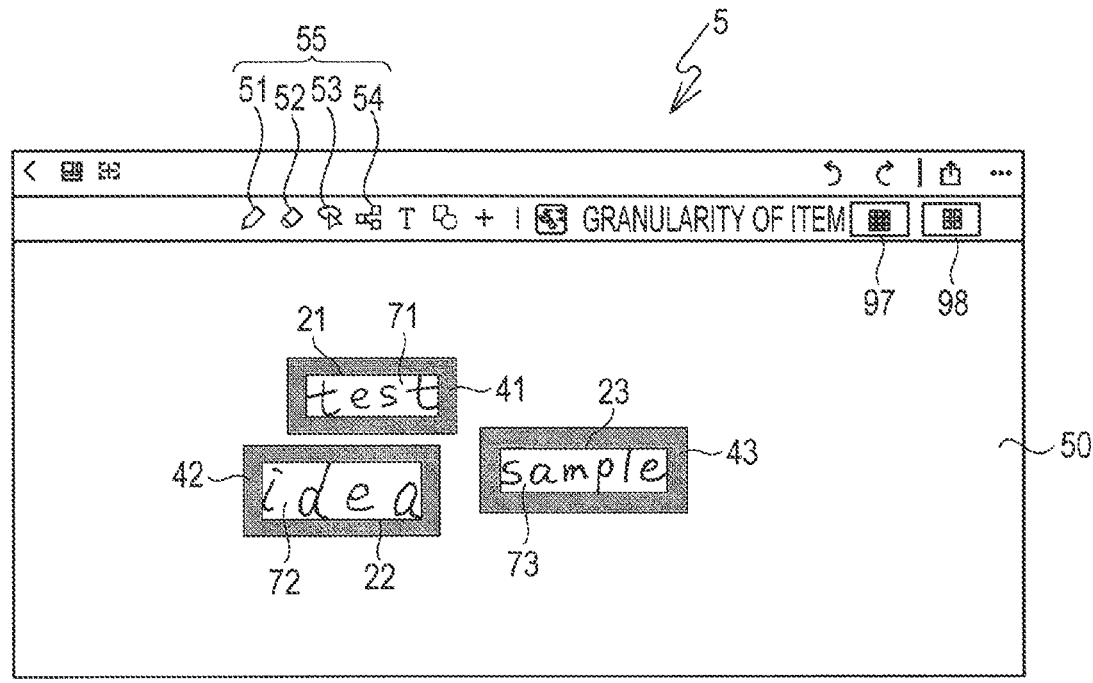

FIG. 23 is a diagram showing an editing window 5 in which a granularity reduce button 97 and a granularity increase button 98 are displayed.

Figure 24:
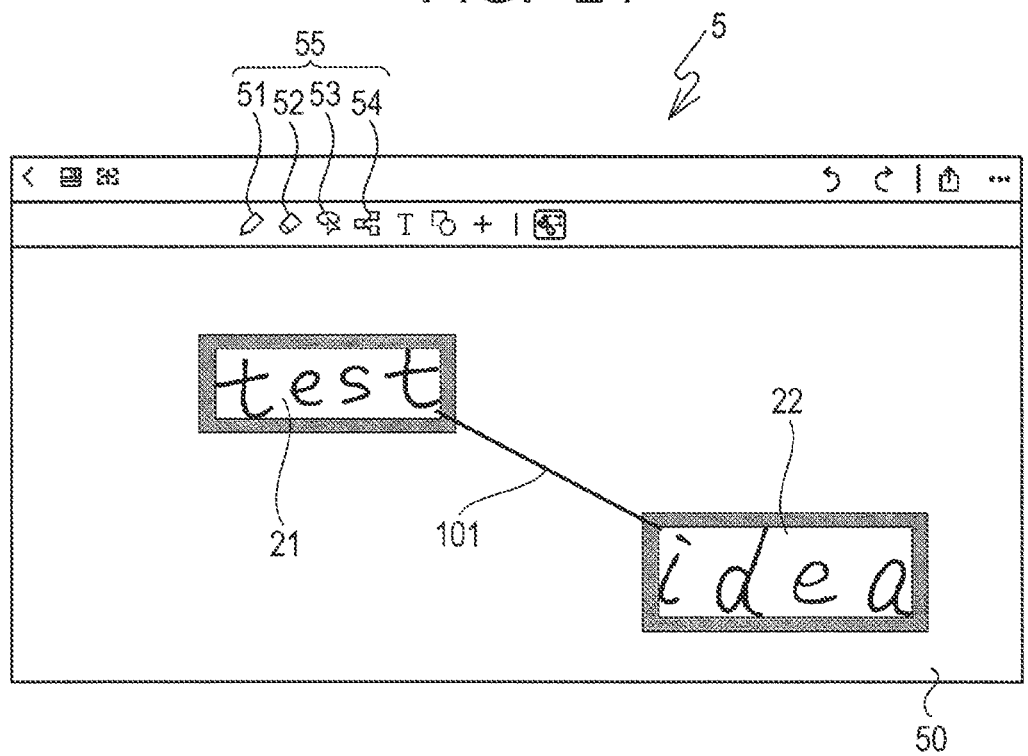

FIG. 24 is a diagram showing a state where items 21 and 22 are connected and combined by a connecting line 101 in an editing window 5.

Figure 25:
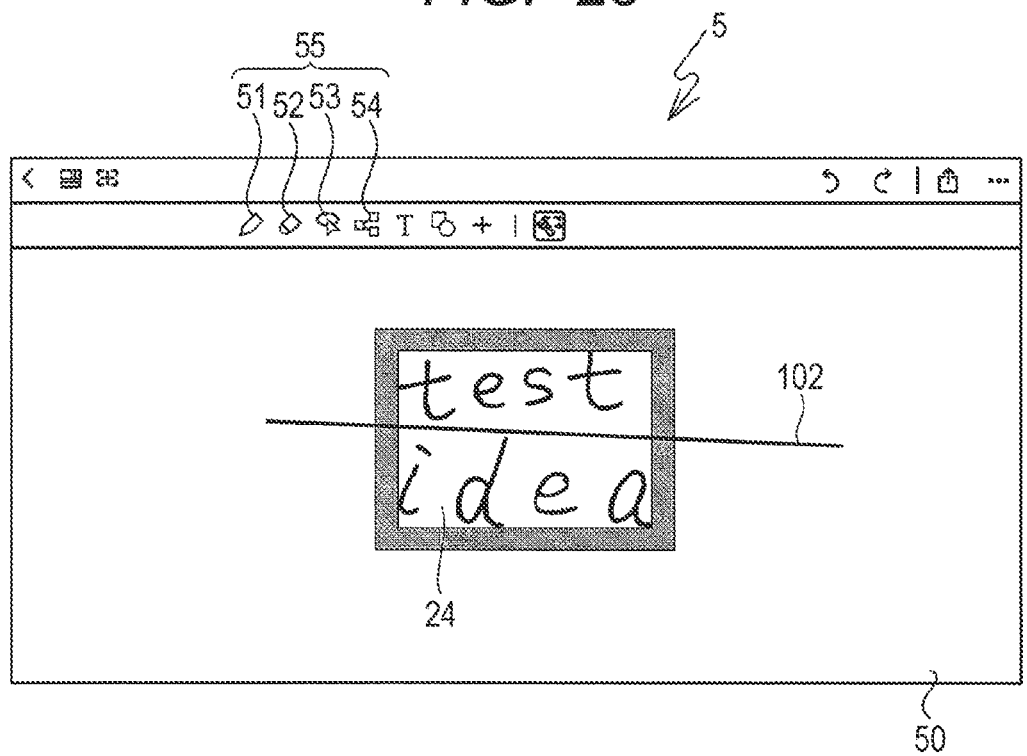

FIG. 25 is a diagram showing a state where a division line 102 is drawn on an item 24 in an editing window 5.

Figure 1:
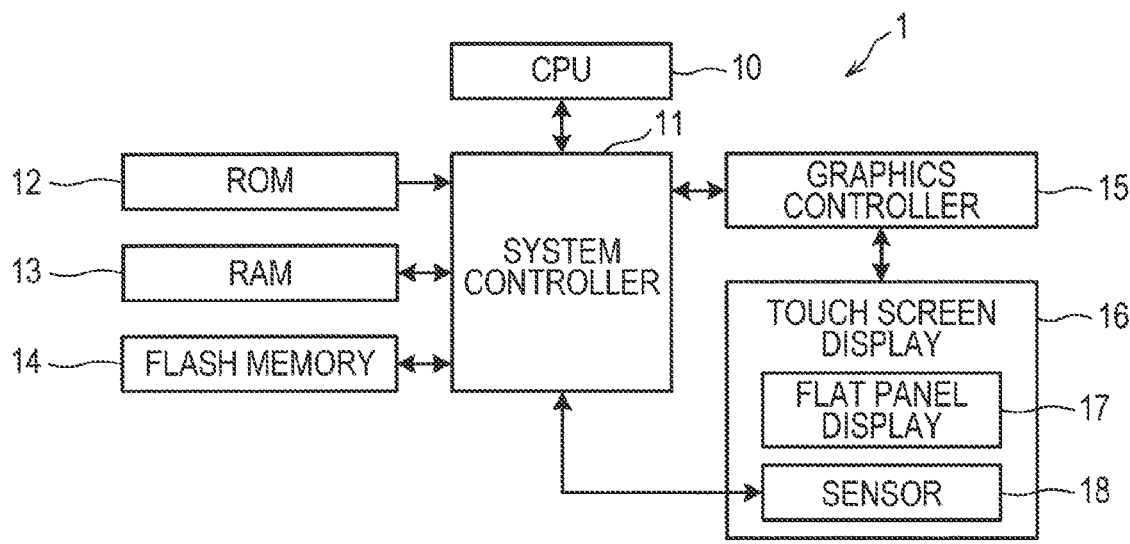
FIG. 1 is a block diagram showing an electrical configuration of an information processing apparatus 1.

Referring to FIG. 1, an electrical configuration of an information processing apparatus 1 will be described. The information processing apparatus 1 includes a CPU 10, a system controller 11, a ROM 12, a RAM 13, a graphics controller 15, and a touch screen display 16 as part of the components.

The CPU 10 collectively controls the information processing apparatus 1. The system controller 11 connects a local bus of the CPU 10 with each component. The ROM 12 stores a BIOS, an OS, setting values, and so on. The RAM 13 temporarily stores data generated when the CPU 10 executes processing. A flash memory 14 stores an editing program that is executed by the CPU 10. The editing program includes a first editing application program and a second editing application program. The first editing application program is executed for executing a first editing application process (see FIG. 5) described later. The second editing application program is executed for executing a second editing application process (see FIG. 11) described later.

The touch screen display 16 includes a flat panel display 17 and a sensor 18. The flat panel display 17 displays visual output to the user. The sensor 18 is configured to detect a touch position of a pen or finger on a screen of the flat panel display 17. The graphics controller 15 controls the display of the flat panel display 17. The information processing apparatus 1 may have an interface connectable to the Internet. The information processing apparatus 1 may acquire programs executed by the CPU 10 via the Internet, or may acquire the programs from an external flash memory (not shown) and store the programs in the flash memory 14 inside the information processing apparatus 1.

In this embodiment, the CPU 10, the system controller 11, the ROM 12, the RAM 13, and the flash memory 14 constitute a computer for controlling the information processing apparatus 1. Details of the flat panel display 17 and the sensor 18 are described in U.S. Patent Application Publication No. 2014/0145928 A1 (Japanese Patent Application Publication No. 2015-38670), and thus, description thereof will be omitted.

Figure 2:
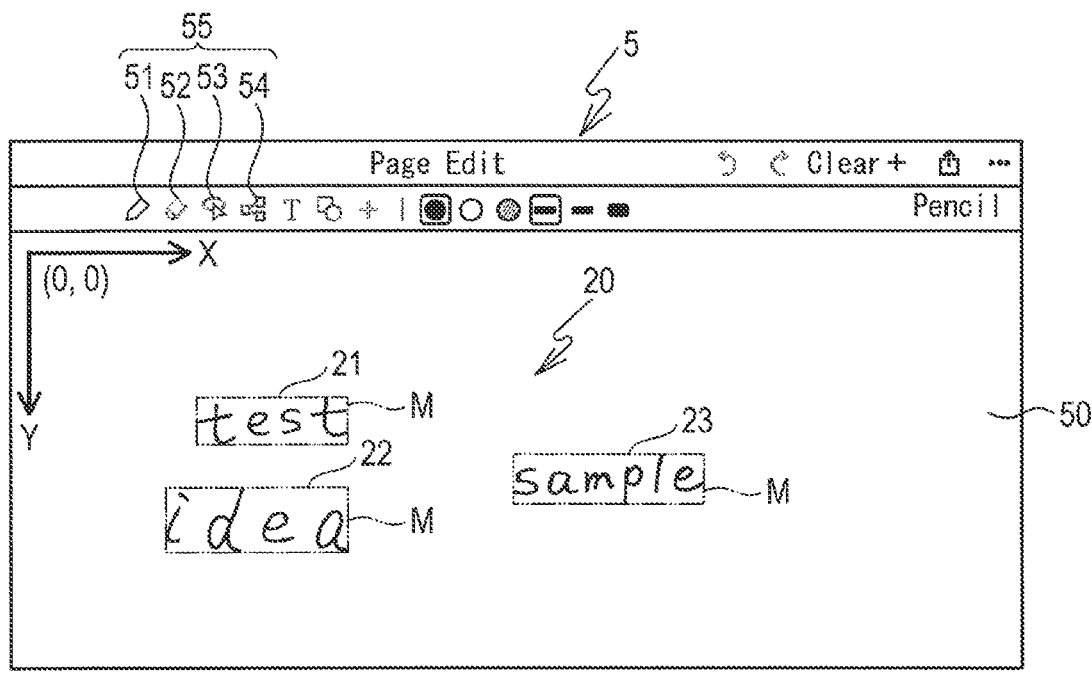
FIG. 2 is a diagram showing an editing window 5.

Referring to FIG. 2, an editing window 5 will be described. In order to start editing a content, the user performs an operation to start a first editing application. The content means, for example, a content of information including at least a character, a character string, a number, a symbol, a figure, and so on. When a starting operation of the first editing application is detected by the sensor 18, the CPU 10 displays the editing window 5 on the touch screen display 16. In the editing window 5, a display region 50 and a plurality of software buttons 55 are provided. The plurality of software buttons 55 includes a pen button 51, an eraser button 52, a selection button 53, and a structuring button 54.

The display region 50 is a region in which items 21 to 23 (collectively referred to as an item 20) constituting the content are displayed. The item 20 is an aggregate of one or more strokes, and is separated and identified by the distance between strokes and the input time. A stroke is one handwriting stroke which is inputted by the user into the display region 50 while the pen button 51 is selected. In other words, a stroke is a handwritten line or curve which is drawn by the user on the screen of the flat panel display 17 from when a pen or finger is touched until the pen or finger is separated. In the example shown in FIG. 2, the item 21 represented by a character string of "test", the item 22 represented by a character string of "idea", and the item 23 represented by a character string of "sample" are displayed as the item 20.

The flash memory 14 stores item information. The item information includes coordinate information and stroke data of the item 20. The coordinate information of the item 21 is the coordinate information of the four corners of a frame line M of the smallest rectangle surrounding the item 21 in the display region 50. The same applies to the coordinate information of the items 22 and 23. The stroke data includes coordinate information of a plurality of points from a start point to an end point of a stroke and time information at which the plurality of points forming the stroke are inputted. The frame line M is data in internal processing by the CPU 10 and is not displayed on the touch screen display 16. An origin (0,0) serving as a reference of coordinate information is arranged in the vicinity of the upper left corner of the display region 50. The horizontal direction corresponds to an X-axis direction, and the vertical direction corresponds to a Y-axis direction. In the embodiment, the origin is in the vicinity of the upper left corner, and a direction extending rightward from the origin corresponds to a positive direction in the X-axis direction. A direction extending downward from the origin corresponds to a positive direction in the Y-axis direction.

Figure 3:
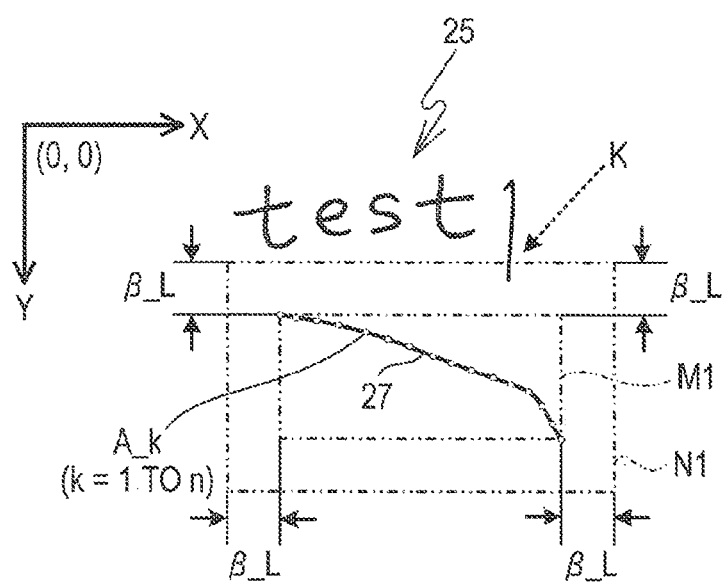
FIG. 3 is a diagram showing a stroke 27 and an item 25.

Referring to FIG. 3, a distance threshold $\beta\_L$ will be described. The distance threshold $\beta\_L$ is a threshold of a distance between strokes. The distance threshold $\beta\_L$ is used to determine whether a stroke 27 inputted by handwriting is the same item or a different item as another item 25 which is previously inputted by handwriting. The default value of the distance threshold $\beta\_L$ is stored in advance in the flash memory 14 by a user setting. The stroke 27 shown in FIG. 3 is a handwritten stroke that has been inputted by handwriting obliquely from the upper left toward the lower right. The CPU 10 creates an item frame M1 of the stroke 27. The item frame M1 is defined as the smallest rectangle surrounding the stroke 27 based on a minimum X coordinate, a maximum X coordinate, a minimum Y coordinate, and a maximum Y coordinate among the coordinates of a plurality of points A_k (k=1 to n) constituting the stroke 27. Based on the created item frame M1, the CPU 10 creates a threshold frame N1. The threshold frame N1 is a rectangular frame having a size obtained by adding the distance threshold $\beta\_L$ to the upper, lower, left and right of the item frame M1.

The item closest to the stroke 27 (hereinafter referred to as an adjacent item) is the item 25. The item 25 is represented by a character string of "test 1" that is arranged laterally. The lower end of the number "1" of the rightmost character of the item 25 is located within the threshold frame N1 of the stroke 27 (see arrow K in FIG. 3). In this case, the CPU 10 recognizes the stroke 27 as the same item as the item 25 in a simplified process described later (see FIG. 8). If the item 25 is not located within the threshold frame N1, the CPU 10 recognizes the stroke 27 as an item different from the item 25.

Figure 4A:
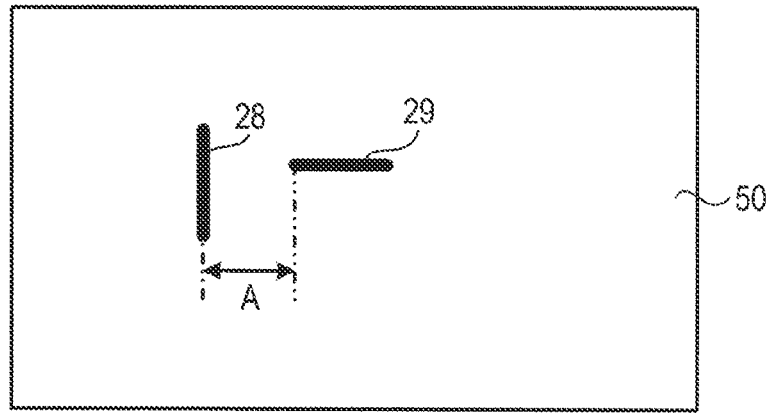
FIGS. 4A to 4C are explanatory diagrams showing a difference in distance A due to different page magnifications.
Figure 4B:
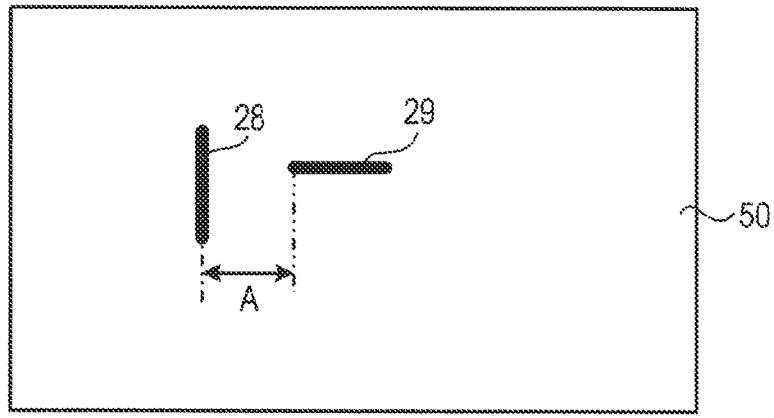
Figure 4C:
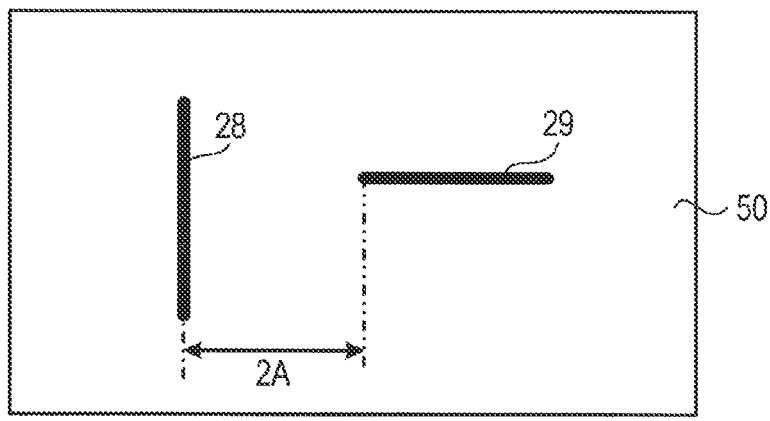

Referring to FIGS. 4A to 4C, the relationship between the distance threshold $\beta\_L$ and page magnification will be described. The distance threshold $\beta\_L$ is a value set based on the page magnification of the display region 50 specified by the user. When the user has changed the page magnification, it is necessary to calculate a distance threshold $\alpha$ corrected according to the page magnification. For example, as shown in FIG. 4A, in the display region 50 having a page magnification of 100%, two strokes 28 and 29 handwritten by the user are displayed. The stroke 28 is a vertical straight line and the stroke 29 is a horizontal straight line. The apparent distance between the strokes 28 and 29 is A. In general, users tend to input characters and so on in a certain size (same size) regardless of the page magnification. Thus, as shown in FIG. 4B, even if the page magnification is 50%, users input the strokes 28 and 29 by handwriting in the same size as when the page magnification is 100%. Thus, the apparent distance between the strokes 28 and 29 is also A.

In the display region 50 shown in FIG. 4B, although the size is the same as that of FIG. 4A, the strokes 28 and 29 are displayed at the page magnification of 50%. Thus, as shown in FIG. 4C, in the internal processing, the CPU 10 calculates the lengths, the positional relationship, and so on, of the strokes 28 and 29 on the scale converted into the page magnification of 100%. Thus, the length of each of the strokes 28 and 29 is twice the case when the page magnification is 50%, and the distance between the strokes 28 and 29 is 2A. Here, the distance threshold α is calculated by the following equation, assuming that the page magnification of the display region 50 at the time of setting the distance threshold β_L is defined as a reference page magnification (100%) and that "α" is a distance threshold at the time when the page magnification is 50%. Note that the distance threshold α is stored in the flash memory 14.

Distance threshold α=Distance threshold β_L×(100/50) =2β_L

Figure 5:
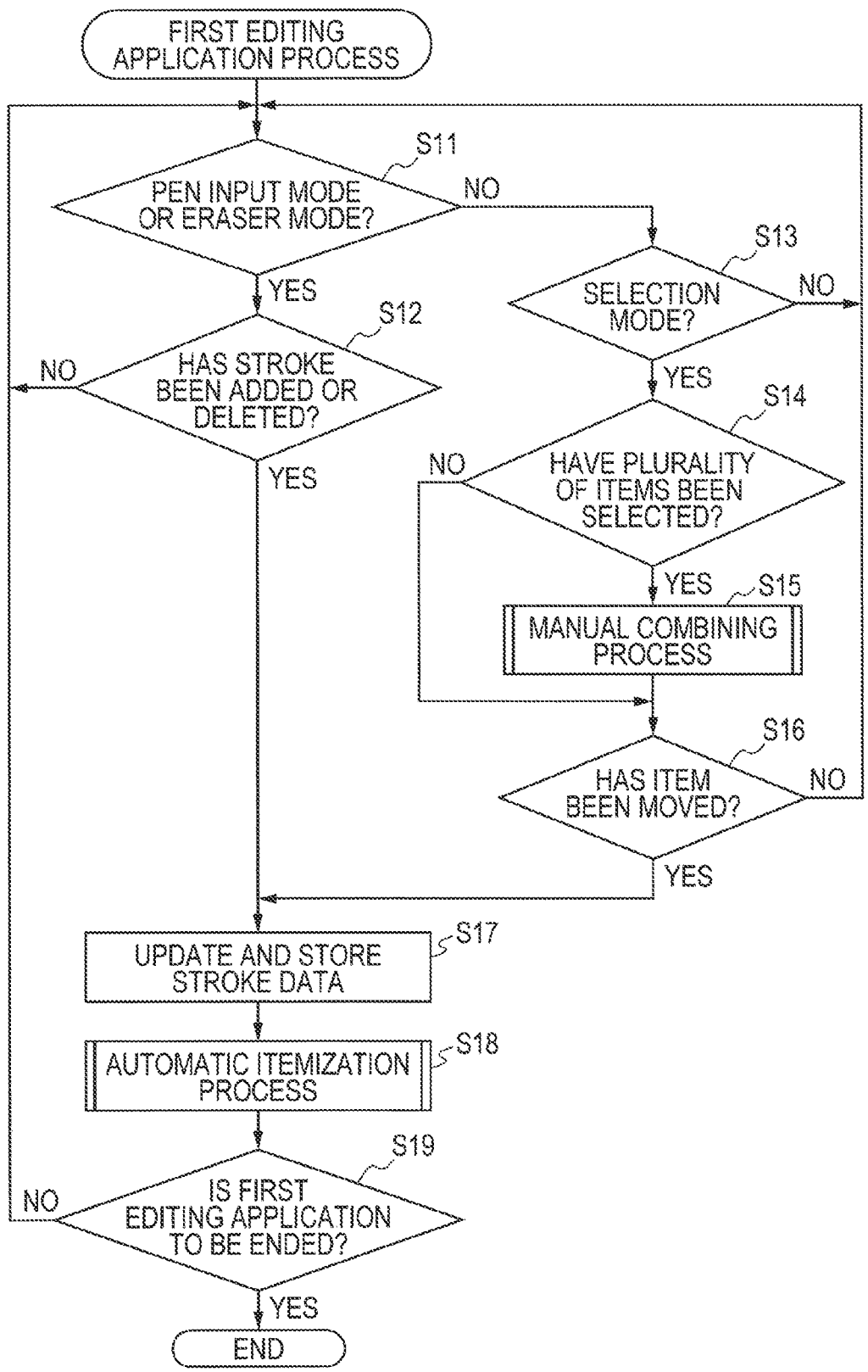
FIG. 5 is a flowchart of a first editing application process.

Referring to FIG. 5, a first editing application process will be described. As described above, when an operation of starting the first editing application is detected by the sensor 18, the CPU 10 reads the first editing application program from the flash memory 14 and executes this process.

The CPU 10 determines whether the mode is a pen input mode or an eraser mode (S11). When the pen button 51 is selected, the mode becomes the pen input mode (S11: YES), and the CPU 10 determines whether a stroke has been added to the display region 50 (S12). When the eraser button 52 is selected, the mode becomes the eraser mode (S11: YES), and the CPU 10 determines whether a stroke in the display region 50 has been deleted (S12). If no stroke is added or deleted (S12: NO), the CPU 10 returns to S11 and repeats the above processing. When a stroke is added or deleted (S12: YES), the CPU 10 updates the stroke data in accordance with the addition or deletion and stores the stroke data in the flash memory 14 (S17).

The CPU 10 executes an automatic itemization process (see FIG. 6) described later (S18). In the automatic itemization process, an itemization of strokes stored in the flash memory 14 is performed. Upon finishing the automatic itemization process, the CPU 10 determines whether the first editing application is to be ended (S19). If the first editing application is not to be ended (S19: NO), that is, if an end button (not shown) is not selected by the user, the CPU 10 returns to S11 and repeats the above processing.

If neither the pen input mode nor the eraser mode is selected (S11: NO), the CPU 10 determines whether the mode is a selection mode (S13). If the mode is not the selection mode either (S13: NO), the CPU 10 returns to S11 and repeats the above processing. When the selection button 53 is selected (S13: YES), the CPU 10 determines whether a plurality of items have been selected by the user in the display region 50 (S14). In order to combine items together, the user selects a plurality of items to be combined. If a plurality of items are not selected (S14: NO), that is, if one item is selected, the CPU 10 proceeds to S16 described later.

When a plurality of items have been selected (S14: YES), the CPU 10 executes a manual combining process described later (S15). In the manual combining process, a plurality of items selected by the user are combined.

When the manual combining process is completed, the CPU 10 determines whether an item has been moved by the user's operation in the display region 50 (S16). When no item has been moved (S16: NO), the CPU 10 returns to S11 and repeats the above processing. When an item has been moved (S16: YES), the CPU 10 updates the stroke data of the item in accordance with the movement of the item, and stores the stroke data in the flash memory 14 (S17). The CPU 10 executes an automatic itemization process (S18) described later. When the first editing application is to be ended (S19: YES), that is, when an end button (not shown) is selected by the user, the CPU 10 ends this process.

Figure 6:
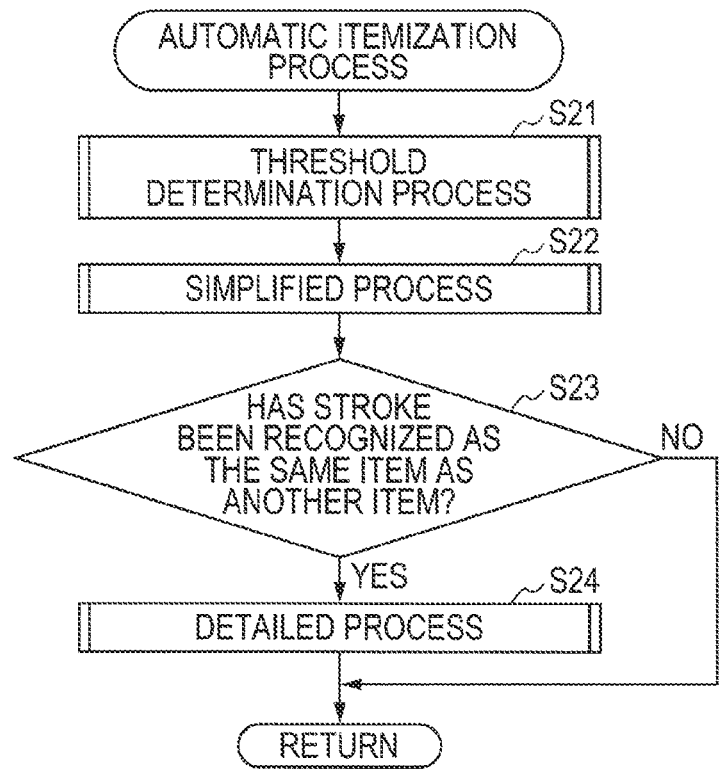
FIG. 6 is a flowchart of an automatic itemization process.
Figure 7:
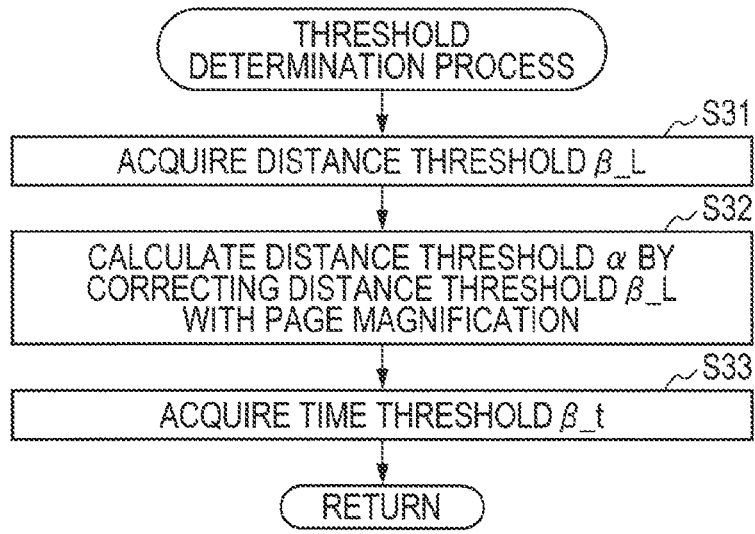
FIG. 7 is a flowchart of a threshold determination process.

Referring to FIGS. 6 to 9, the automatic itemization process will be described. As shown in FIG. 6, the CPU 10 executes a threshold determination process (S21). As shown in FIG. 7, the CPU 10 acquires the distance threshold β_L from the flash memory 14 (S31). The CPU 10 calculates the distance threshold α by correcting the acquired distance threshold β_L based on the page magnification (S32). The CPU 10 acquires a time threshold β_t from the flash memory 14 (S33). The CPU 10 ends this process and returns to the automatic itemization process shown in FIG. 6. The CPU 10 executes a simplified process (S22).

Figure 8:
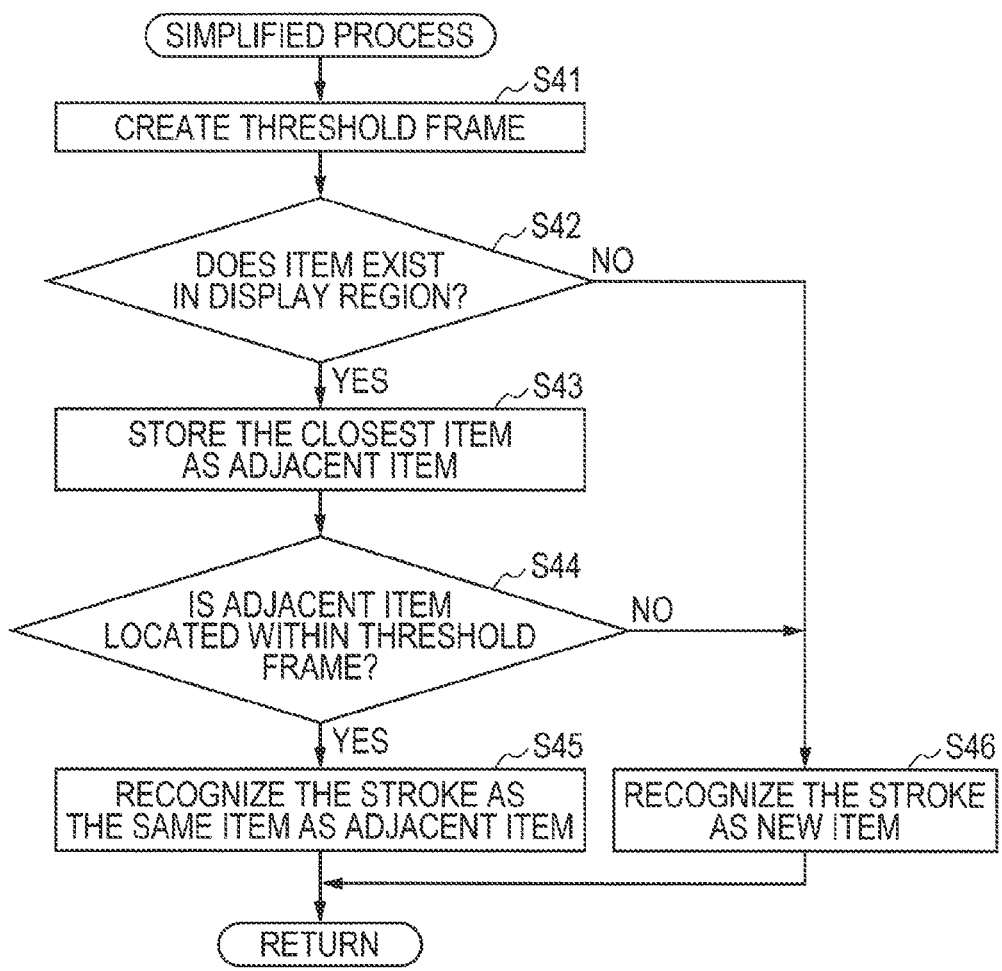
FIG. 8 is a flowchart of a simplified process.

As shown in FIG. 8, for example, the CPU 10 creates the threshold frame N1 for the stroke 27 which has been handwritten into the display region 50 shown in FIG. 3 (S41). As described above, the CPU 10 creates the item frame M1, and creates the threshold frame N1 by adding the distance threshold β_L to the created item frame M1. In this embodiment, the page magnification of the display region 50 is not changed after the distance threshold is set to β_L in the second editing application process described later and before the first editing application process is executed. Thus, the distance threshold remains at β_L. Instead of this method, for example, the CPU 10 may add the distance threshold β_L to a plurality of points A_k (k=1 to n) constituting the stroke 27, and create a rectangular frame having the largest range as the threshold frame N1. Further, the threshold frame N1 may have a shape other than a rectangle, and may be, for example, a substantially elliptical (elongated circle) frame obtained by adding the distance threshold β_L around the stroke 27.

The CPU 10 determines whether the item 25 exists in the display region 50 (S42). In response to determining that no item 25 exists in the display region 50 (S42: NO), the CPU 10 recognizes the stroke 27 as a new item (S46). In response to determining that one or more items 25 exist in the display region 50 (S42: YES), the CPU 10 stores the item 25 closest to the stroke 27 as an adjacent item (S43). The CPU 10 determines whether the adjacent item is located within the range of the threshold frame N1 (S44). As shown in the example of FIG. 3, if the item 25 which is the adjacent item is located within the range of the threshold frame N1 (S44: YES), the CPU 10 recognizes the stroke 27 as the same item as the item 25 (S45). If the adjacent item is not located within the range of the threshold frame N1 (S44: NO), the CPU 10 recognizes the stroke as a new item different from the adjacent item (S46). The CPU 10 ends this process and returns to the automatic itemization process shown in FIG. 6.

In the simplified process of S22, the CPU 10 determines whether the stroke has been recognized as the same item as another item (S23). When the stroke is recognized as another item (S23: NO), the CPU 10 ends this process and returns to the first editing application process of FIG. 5. When the stroke is recognized as the same item (S23: YES), the CPU 10 executes a detailed process (S24).

Figure 9:
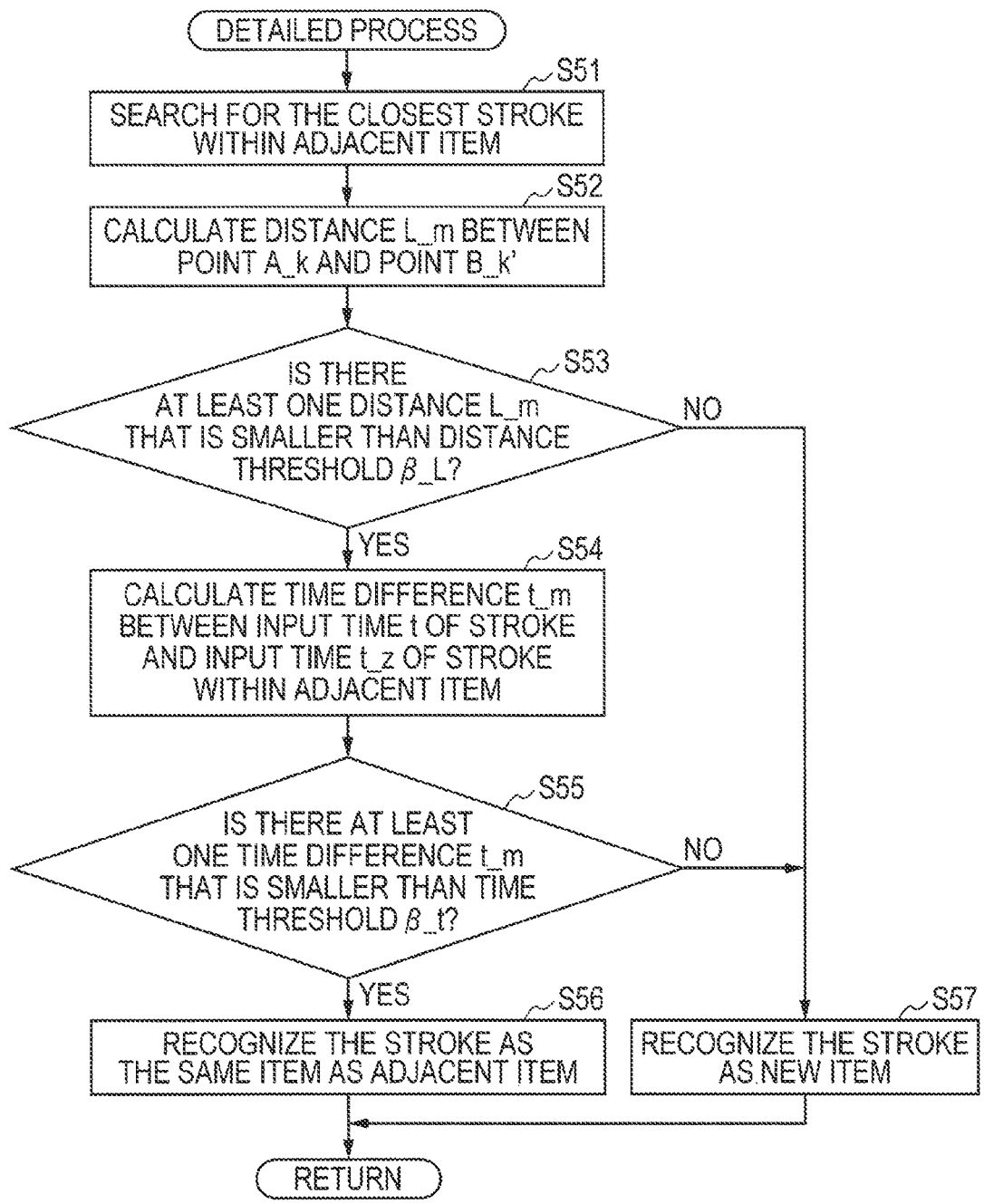
FIG. 9 is a flowchart of a detailed process.
Figure 13:
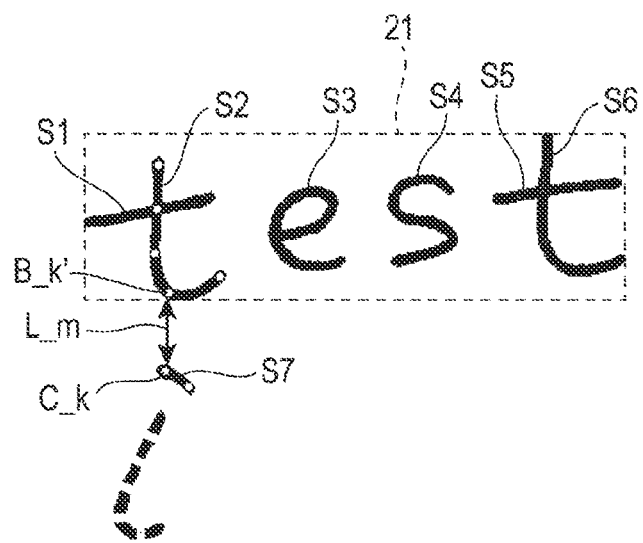
FIG. 13 is a diagram showing a distance L_m between a point B_k' of a stroke S2 and a point C_k of a stroke S7.

As shown in FIG. 9, the CPU 10 searches for the closest stroke within the adjacent item (S51). For example, an example shown in FIG. 13 shows a state in which, after inputting a character string of "test" horizontally by handwriting, the first stroke S7 of "i" of "idea" is inputted by handwriting below "t". The character "t" (the first "t") is composed of two strokes S1 and S2. The character "e" is composed of one stroke S3. The character "s" is composed of one stroke S4. The character "t" (the second "t") is composed of two strokes S5 and S6. The character string "test" is identified as the item 21. The adjacent item of the stroke S7 is the item 21. In the item 21, the stroke closest to the stroke S7 is the second stroke S2 of "t".

The CPU 10 calculates each of distances $L\_m$ between a plurality of points $C\_k$ (k=1 to n) constituting the stroke S7 and a plurality of points $B\_k'$ (k'=1 to n') constituting the stroke S2 in the item 21 (S52). In the example of FIG. 13, the distance $L\_m$ between a point $B\_k'$ at the lowermost end of the stroke S2 and a point $C\_k$ at the start point of the stroke S7 is shown. The CPU 10 determines whether there is any distance $L\_m$ smaller than the distance threshold $β\_L$ among the calculated plurality of distances $L\_m$ (S53). In response to determining that all the distances $L\_m$ are larger than the distance threshold $β\_L$ (S53: NO), the CPU 10 recognizes the stroke S7 as a new item (S57).

In response to determining that there is at least one distance $L\_m$ smaller than the distance threshold $β\_L$ (S53: YES), the CPU 10 calculates each of time differences $t\_m$ between input time $t\_z$ at which the plurality of points forming the strokes S1 to S6 in the item 21 are inputted and input time t at which the start point $C\_k$ of the stroke S7 is inputted (S54). This is for determining in more detail based on time information at which a plurality of points forming the strokes have been inputted, although the stroke is recognized as the same item in the aforementioned simplified process. The CPU 10 stores the input time of each stroke in the flash memory 14. The CPU 10 determines whether there is at least one time difference $t\_m$ that is smaller than a time threshold $β\_t$ (S55). The time threshold $β\_t$ is a threshold of the time difference $t\_m$. The default value of the time threshold $β\_t$ is stored in advance in the flash memory 14 by user setting.

In response to determining that all the time differences $t\_m$ are larger than the time threshold $β\_t$ (S55: NO), the CPU 10 recognizes the stroke as a new item different from the adjacent item (S57). In the example of FIG. 13, since the user recognizes "test" and "idea" as separate character strings, when inputting the character strings by handwriting, a certain time difference is generated between "test" and "idea". Thus, even if the distance $L\_m$ is smaller than the distance threshold $β\_L$, the time difference $t\_m$ becomes larger than the time threshold $β\_t$ (S55: NO), and thus the CPU 10 recognizes the stroke S7 as a new item different from the item 21 (S57). Since the time difference between the character strings varies depending on the user, the time threshold $β\_t$ may be set to suit the user who uses the information processing apparatus 1.

In response to determining that there is at least one time difference $t\_m$ smaller than the time threshold $β\_t$ (S55: YES), the CPU 10 recognizes the stroke S7 as the same item as the item 21 (S56). In this way, the CPU 10 ends the detailed process.

Figure 10:
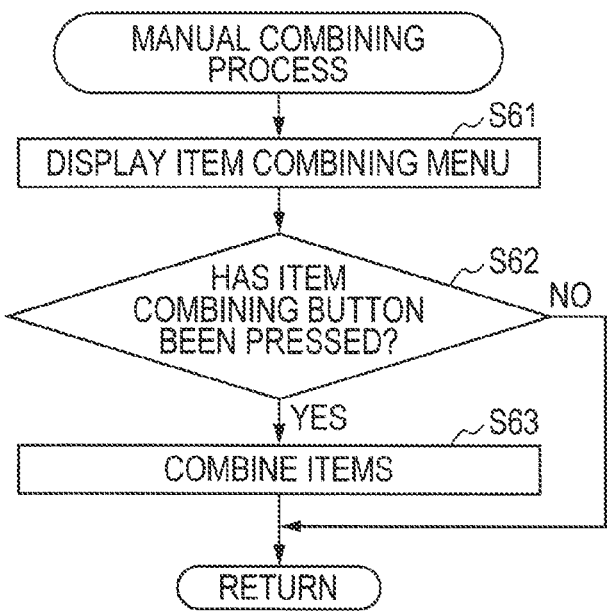
FIG. 10 is a flowchart of a manual combining process.
Figure 14A:
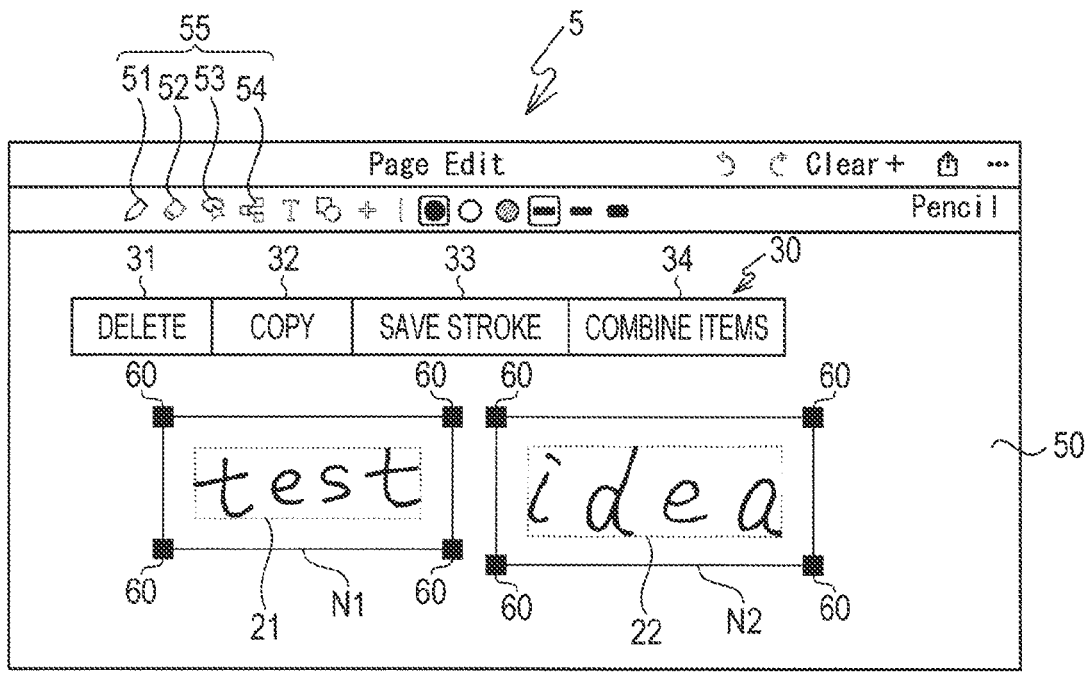
FIGS. 14A and 14B are diagrams showing a flow of manually combining items 21 and 22.
Figure 14B:
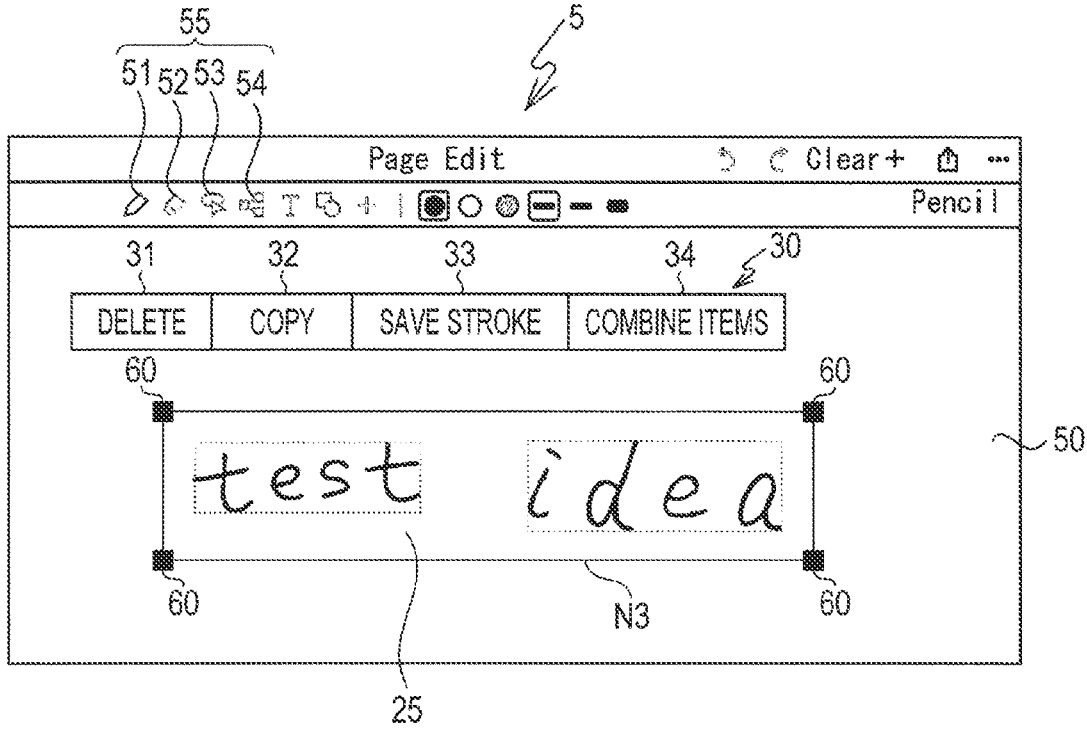

Referring to FIGS. 10, 14A and 14B, a manual combining process will be described. The edit window 5 shown in FIG. 14A is in the selection mode. In the display region 50, the items 21 and 22 are displayed. As shown in FIG. 10, the CPU 10 displays an item combining menu 30 in the display region 50 (S61). The item combination menu 30 is a menu bar extending in the left-right direction, and includes, in order from the left, a delete button 31, a copy button 32, a save button 33, and an item combining button 34. The delete button 31 is pressed for deleting an item. The copy button 32 is pressed for copying an item. The save button 33 is pressed for storing a selected stroke. The item combining button 34 is pressed for combining selected items.

In FIG. 14A, when combining the two items 21 and 22 displayed in the display region 50, the user taps and selects the items 21 and 22. Then, a threshold frame N1 is displayed around the item 21, a threshold frame N2 is displayed around the item 22, and a rectangular mark 60 is displayed in each of the four corners of the threshold frame N1 and the four corners of the threshold frame N2. In this state, the items 21 and 22 are selected.

The CPU 10 determines whether the item combining button 34 has been pressed (S62). When the item combining button 34 is not pressed (S62: NO), the CPU 10 ends this process, and returns to the first editing application process of FIG. 5. When the item combining button 34 is pressed (S62: YES), as shown in FIG. 14B, the CPU 10 combines the items 21 and 22 (S63), recognizes the combined item as a new item 25, and stores the new item in the flash memory 14. Since the item 25 after combining is in the selected state, a threshold frame N3 and the four rectangular marks 60 are displayed around the item 25. By canceling the selection, the threshold frame N3 and the four rectangular marks 60 are erased. The CPU 10 ends this process and returns to the editing application process of FIG. 5.

Figure 11:
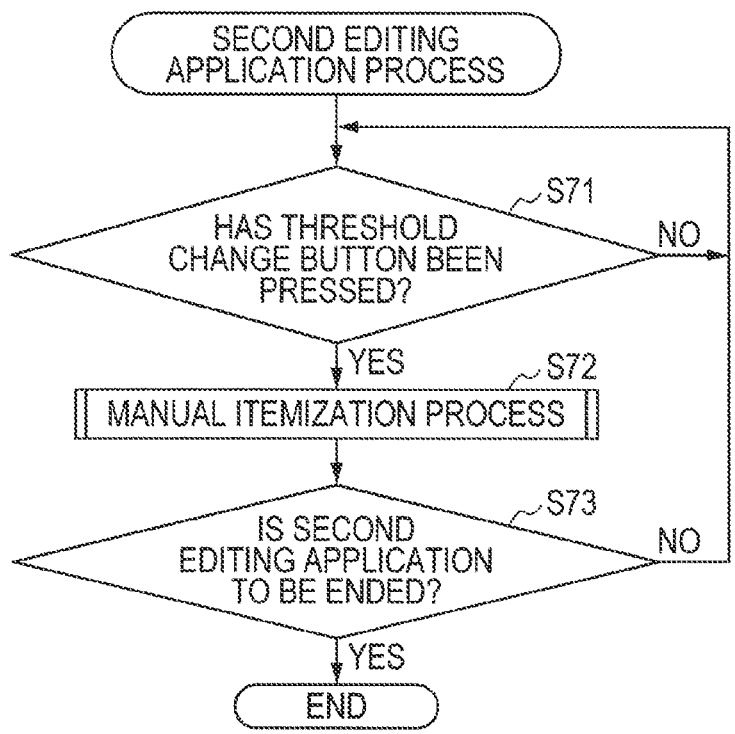
FIG. 11 is a flowchart of a second editing application process.
Figure 15:
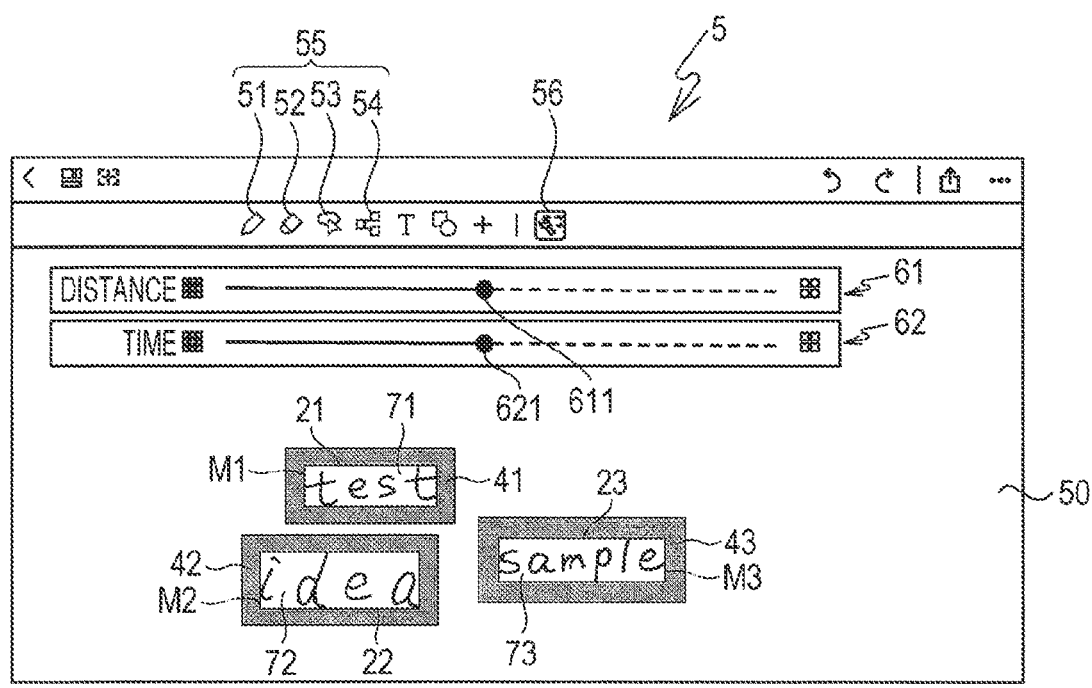
FIG. 15 is a diagram showing the editing window 5 when a second editing application is started.

Referring to FIG. 11 and FIG. 15, the second editing application process will be described. When manually changing the distance threshold $β\_L$ and the time threshold $β\_t$, the user presses the structuring button 54 and starts the second editing application. When the operation of the structuring button 54 is detected by the sensor 18, the CPU 10 reads the second editing application program from the flash memory 14 and executes this process.

When the second editing application is started, as shown in FIG. 15, in the upper portion of the display region 50 of the editing window 5, a threshold change button 56 is newly displayed on the right side of the plurality of software buttons 55. The three items 21 to 23 are displayed in the display region 50.

As shown in FIG. 11, the CPU 10 determines whether the threshold change button 56 has been pressed (S71). When the threshold change button 56 is not pressed (S71: NO), the CPU 10 returns to S71 and stands by. When the threshold change button 56 is pressed (S71: YES), the CPU 10 executes a manual itemization process described later (S72). Upon finishing the manual itemization process, the CPU 10 determines whether the second editing application is to be ended (S73). When the second editing application is not to be ended (S73: NO), the CPU 10 returns to S71 and repeats the above processing. When the second editing application is to be ended (S73: YES), the CPU 10 ends this process.

Figure 12:
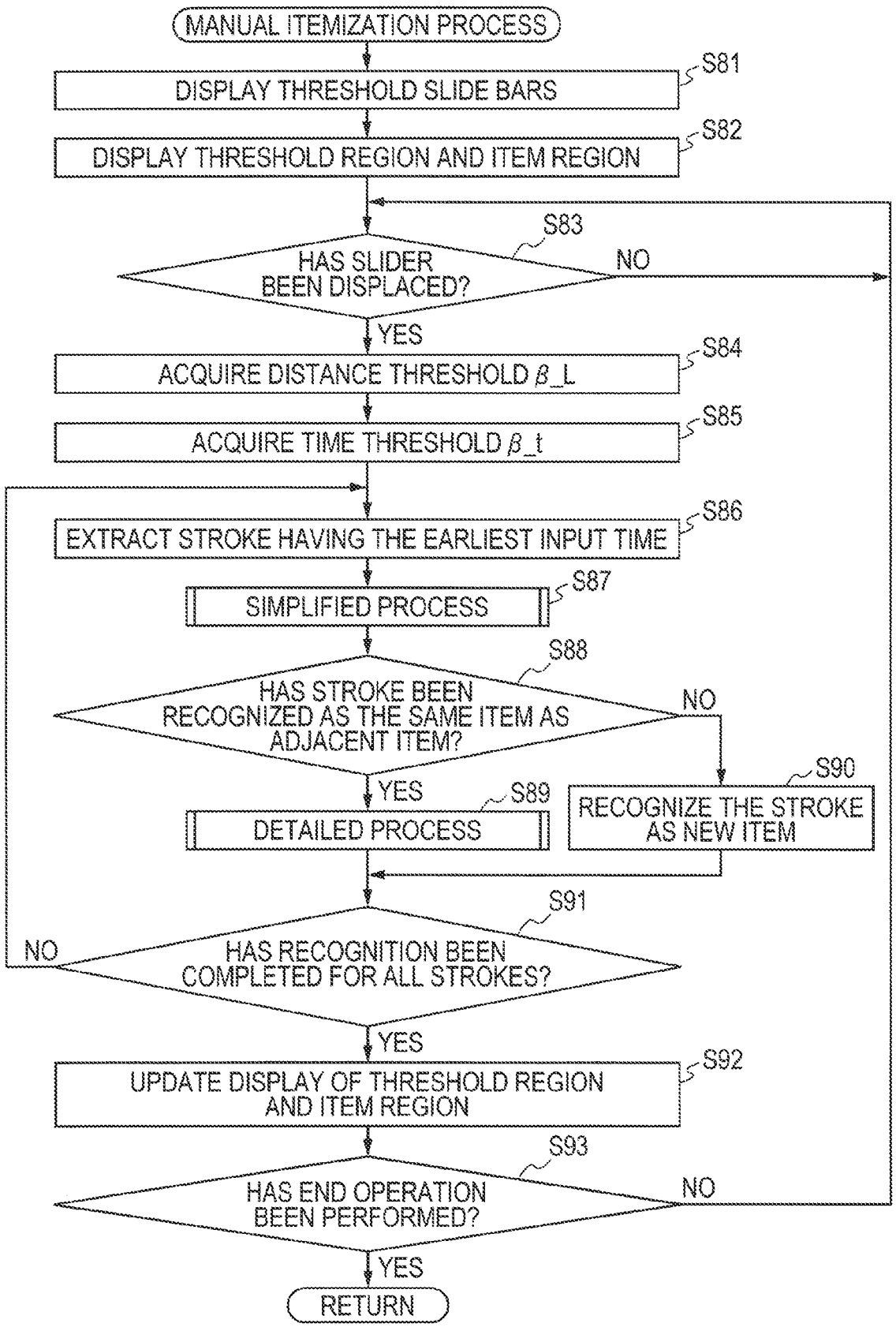
FIG. 12 is a flowchart of a manual itemization process.

Referring to FIGS. 12 and 15 to 22, the manual itemization process will be described. As shown in FIG. 12, the CPU 10 displays, in the display region 50, a distance threshold slide bar 61 and a time threshold slide bar 62 (see FIG. 15) which are arranged vertically (S81). By sliding a slider 611 of the distance threshold slide bar 61 in the left-right direction, the distance threshold β_L is changed continuously. As the slider 611 is moved to the right, the distance threshold β_L becomes larger. As the slider 611 is moved leftward, the distance threshold β_L becomes smaller. By sliding a slider 621 of the time threshold slide bar 62 in the left-right direction, the time threshold β_t is changed continuously. As the slider 621 is moved to the right, the time threshold β_t becomes larger. As the slider 621 is moved to the left, the time threshold β_t becomes smaller.

As shown in FIGS. 16A and 16B, the distance threshold slide bar 61 has a reference position Pat an intermediate position in the displacement direction of the slider 611. The reference position P of the slider 611 corresponds to a default value of the distance threshold β_L. The time threshold slide bar 62 also has a reference position P at an intermediate position in the displacement direction of the slider 621. The reference position P of the slider 621 corresponds to a default value of the time threshold β_t.

The CPU 10 displays a threshold region and an item region for each of all items displayed in the display region 50 (S82). As shown in FIG. 16A, the CPU 10 displays a threshold region 41 and an item region 71 for the item 21. The CPU 10 displays a threshold region 42 and an item region 72 for the item 22. The CPU 10 displays a threshold region 43 and an item region 73 for the item 23. The threshold regions 41 to 43 are rectangular frame-shaped regions surrounding item frames M1 to M3 of the items 21 to 23, and are displayed in gray, for example. The width of the threshold regions 41 to 43 is ½ of the distance threshold β_L. The item regions 71 to 73 are rectangular regions inside the item frames M1 to M3 of the items 21 to 23.

The CPU 10 determines whether the slider 611 or 621 has been displaced (S83). When none of the sliders is displaced (S83: NO), the CPU 10 returns to S83 and stands by. When the slider 611 or 621 is displaced (S83: YES), the CPU 10 acquires the distance threshold β_L corresponding to the position of the slider 611 (S84). The CPU 10 acquires the time threshold β_t corresponding to the position of the slider 621 (S85).

The CPU 10 extracts a stroke including the point of the earliest input time from among the items displayed in the display region 50 (S86). The CPU 10 executes the simplified process as in S22 (see FIG. 8) for the extracted stroke (S87). In the simplified process, the CPU 10 determines whether the extracted stroke is recognized as the same item as the adjacent item (S88). When the extracted stroke is recognized as the same item as the adjacent item (S88: YES), the CPU 10 executes the detailed process similar to S24 (see FIG. 9) (S89). When the extracted stroke is not recognized as the same item as the adjacent item (S88: NO), the CPU 10 recognizes the stroke as a new item as recognized in the simplified process (S90).

The CPU 10 determines whether recognition has been completed for all strokes (S91). When the recognition has not been completed (S91: NO), the CPU 10 returns to S86 and repeats the above processing for the stroke with the next earliest input time (S86 to S90). When the recognition has been completed for all strokes (S91: YES), the CPU 10 updates the display of the threshold region and the item region for the item for which the recognition has been completed (S92). The specific display of the threshold region and the item region will be described later. The CPU 10 determines whether an end operation has been performed (S93). When no end operation is performed (S93: NO), the CPU 10 returns to S83 and repeats the above processing. When an end operation is performed (S93: YES), the CPU 10 ends this process and returns to the second editing application process of FIG. 11.

Figure 17:
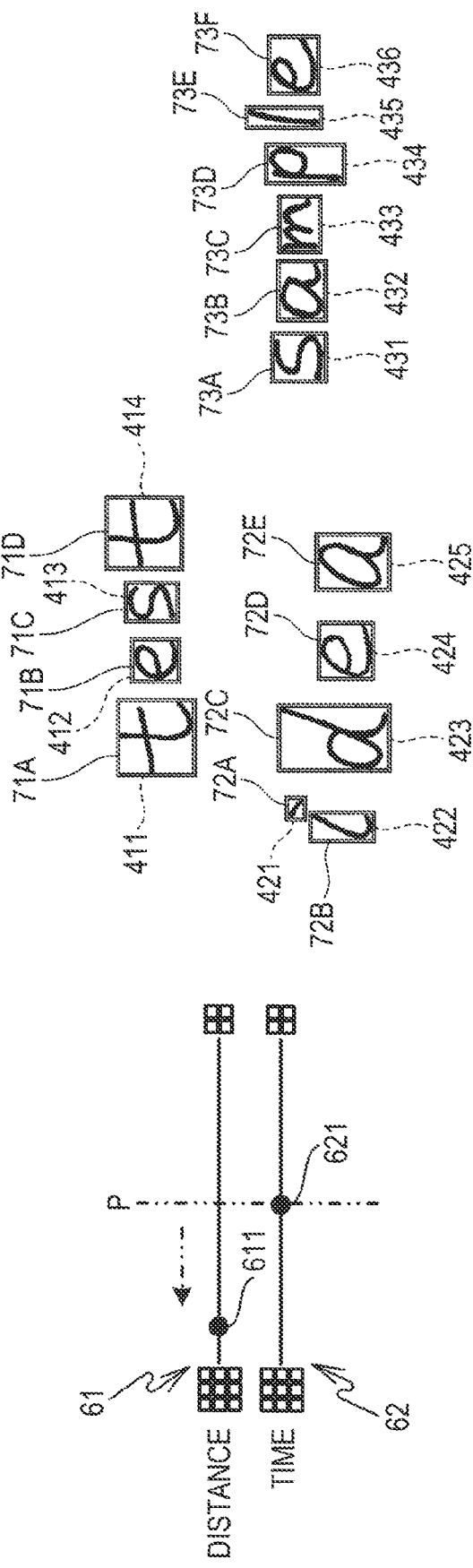
FIG. 17 is a diagram showing a state where the distance threshold is reduced by the slider 611 from the state of FIG. 16A.

Referring to FIGS. 16A, 16B and 17, a case where the slider 611 of the distance threshold slide bar 61 is displaced and only the distance threshold β_L is changed will be described. In the state shown in FIG. 16A, the slider 611 is displaced rightward from the reference position P. In this case, the distance threshold β_L increases according to the amount of displacement of the slider 611. While the sizes of the item regions 71 to 73 of the items 21 to 23 do not change, the areas (square measure) of the threshold regions 41 to 43 gradually increase in conjunction with the displacement of the slider 611.

Then, when the threshold region 41 of the item 21 and the threshold region 42 of the item 22 come into contact with each other, the distance between the items 21 and 22 is the distance threshold β_L. At this time, by the above-described simplified process (S87) and detailed process (S89), the items 21 and 22 are recognized as the same item. By further displacing the slider 611 rightward, like the items 21 and 22, the item 23 is also recognized as the same item. As a result, as shown in FIG. 16B, the items 21 to 23 are recognized as one item 24, and a threshold region 44 and an item region 74 are displayed for the item 24. The item region 74 is surrounded by an item frame M4. The threshold region 44 is surrounded by a threshold frame N4. The item region 74 is the smallest rectangle including three character strings of "test", "idea", and "sample". The width of the threshold region 44 is ½ of the changed distance threshold β_L. When the slider 611 is displaced leftward from the state shown in FIG. 16A, the distance threshold β_L decreases according to the displacement amount of the slider 611, and thus the widths of the threshold regions 41 to 43 of the items 21 to 23 gradually decrease. The "test" of the item 21 is recognized as separate items of "t", "e", "s" and "t". The "idea" of the item 22 is recognized as separate items of "i", "d", "e", and "a". The "sample" of the item 23 is recognized as separate items of "s", "a", "m", "p", "l", and "e".

Finally, all spaced strokes are recognized as separate items as shown in FIG. 17. Specifically, the item region 71 of the "test" is separated into four item regions 71A to 71D, the item region 72 of the "idea" separated into five item regions 72A to 72E, and the item region 73 of the "sample" is separated into six item regions 73A to 73F. Threshold regions 411 to 414 are displayed around the item regions 71A to 71D, respectively. Threshold regions 421 to 425 are displayed around the item regions 72A to 72E, respectively. Threshold regions 431 to 436 are displayed around the item regions 73A to 73F, respectively. The widths of all of these threshold regions are further reduced according to the amount of displacement of the slider 611. In this way, a change in the distance threshold β_L is applied to all the items 20 that are inputted in the display region 50.

Figure 18A:
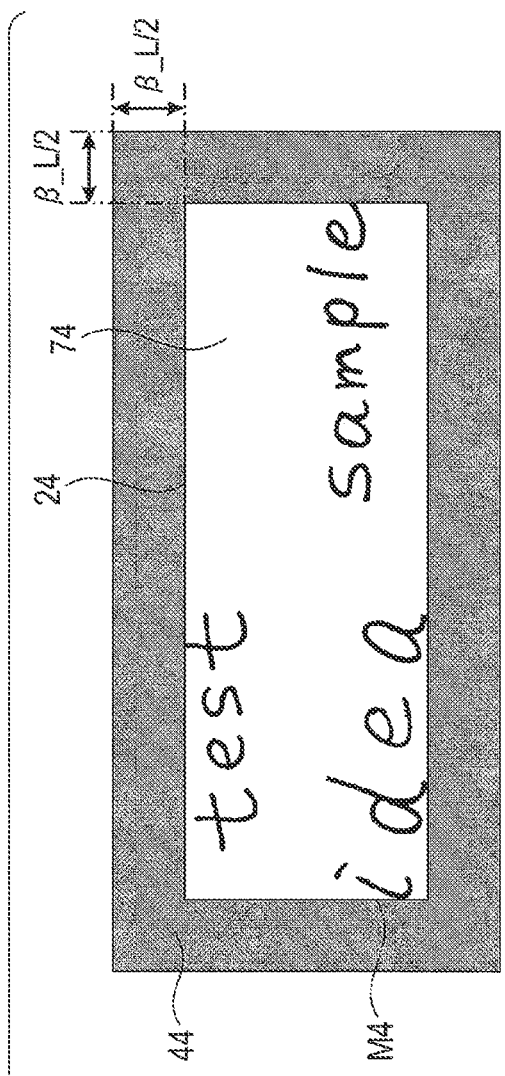
FIG. 18A is a diagram showing a state where an item region 74 is displayed.
Figure 18B:
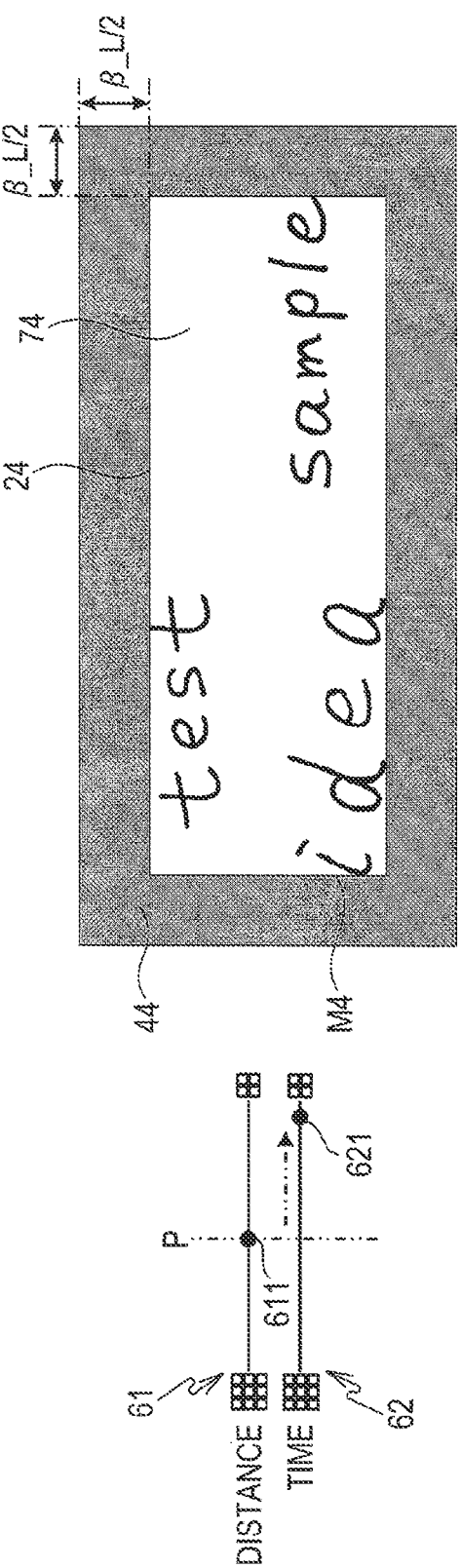
FIG. 18B is a diagram showing a state where a time threshold is increased by a slider 621 from a state of FIG. 18A.

Referring to FIGS. 18A to 19B, a case in which the slider 621 of the time threshold slide bar 62 is displaced and only the time threshold β_t is changed will be described. As shown in FIG. 18A, in the display region 50, as in the case of FIG. 16B, an item 24 including three character strings "test", "idea", and "sample", a threshold region 44, and an item region 74 are displayed. Both of the sliders 611 and 621 are located at the reference position P. In this state, as shown in FIG. 18B, only the slider 621 is displaced to the right. In this case, the time threshold β_t increases according to the amount of displacement of the slider 621, and the distance threshold β_L does not change. Since the three character strings of "test", "idea" and "sample" are recognized as one item 24 before the slider 621 is displaced, the time difference t_m of the input time of the strokes constituting each character string is smaller than the time threshold β_t. Since the time threshold β_t increases from this state, in the detailed process (see FIG. 9), a state does not change from a state in which the time difference t_m is smaller than the time threshold β_t (S55: YES). Accordingly, in the display region 50, as in FIG. 18A, a state in which the item 24, the threshold region 44, and the item region 74 are displayed is maintained.

Figure 19A:
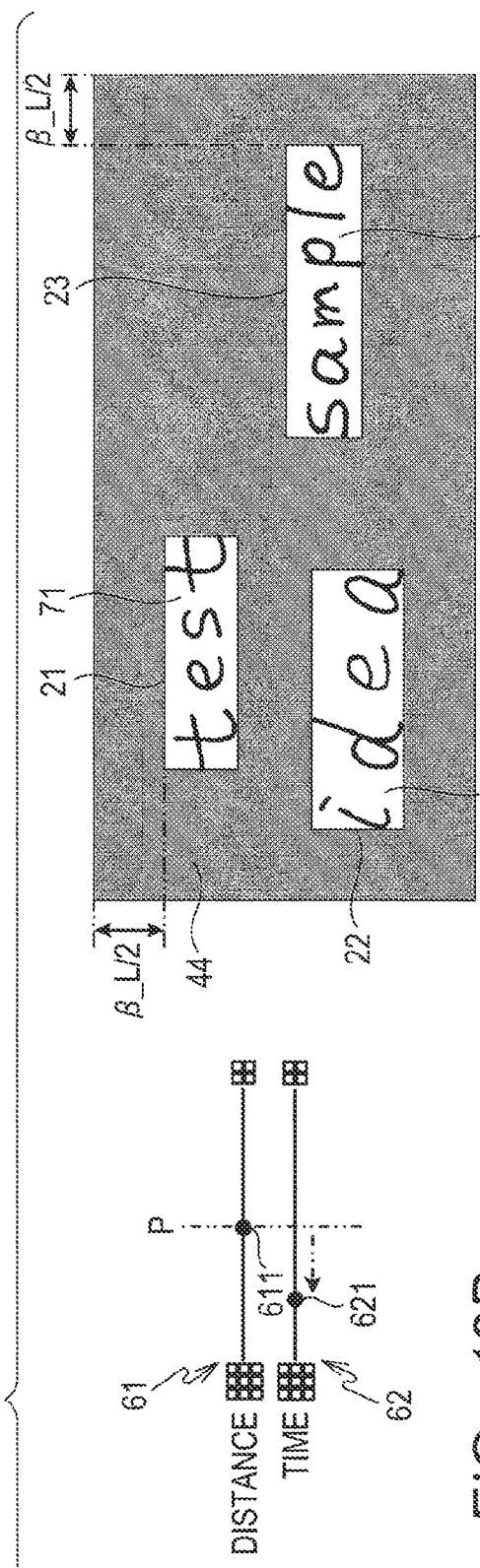
FIGS. 19A and 19B are diagrams showing states where the time threshold is reduced by the slider 621 from the state of FIG. 18A.

On the other hand, the slider 621 is displaced leftward from the state shown in FIG. 18A. In this case, as shown in FIG. 19A, the time threshold β_t decreases according to the amount of displacement of the slider 621. When the time threshold β_t decreases, strokes having the time difference t_m larger than the time threshold β_t appear among the strokes constituting the character strings. The input times of the character strings of "test", "idea" and "sample" differ from each other, and a user-specific interval exists between each input time of one character string and another character string. Thus, as the time threshold β_t decreases, the item 24 is recognized separately as three items 21 to 23 corresponding to "test", "idea", and "sample". The item region 74 is separated into item regions 71 to 73, and the displayed areas thereof are changed. Note that since the distance threshold β_L has not been changed, the size of the threshold region 44 does not change.

When the slider 621 is further displaced leftward from the state shown in FIG. 19A, the item 21 is further separated and recognized in four items of "t", "e", "s", and "t", the item 22 is further separated and recognized in four items of "i", "d", "e", and "a", the item 23 is further separated and recognized in six items of "s", "a", "m", "p", "l", and "e". Accordingly, the item regions 71 to 73 are separately displayed so as to correspond to each item.

Figure 19B:
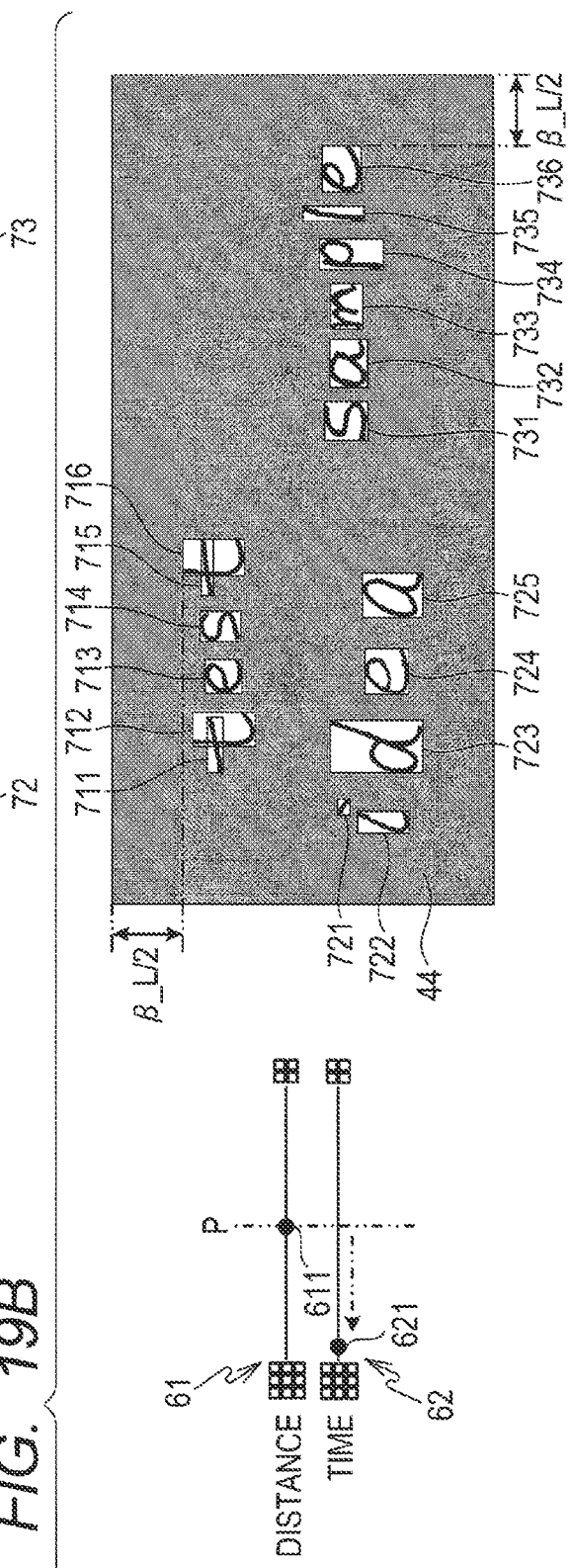

Then, as shown in FIG. 19B, when the slider 621 is further displaced leftward, each item is recognized separately for each stroke, and accordingly, the item region is further separated and displayed. The character string "test" is displayed separately in six item regions 711 to 716 corresponding to six strokes. The character string of "idea" is displayed separately in five item regions 721 to 725 corresponding to five strokes. The character string of "sample" is displayed separately in six item regions 731 to 736 corresponding to six strokes.

As described above, by reducing the time threshold β_t, the number of items and the area of each region are changed and displayed, that is, from the item region 74 to the item regions 71 to 73, and from the item regions 71 to 73 to the item regions 711 to 716, 721 to 725, and 731 to 736. This enables the user to easily view the change of the time threshold β_t in the form of a change of the number of the item regions and a change of the area of the item regions. This change in the time threshold β_t is applied to all the items 20 that are inputted in the display region 50.

As described above, the editing program of the present embodiment is executed by the CPU 10 of the information processing apparatus 1. By executing the editing program, the CPU 10 acquires a plurality of strokes inputted via the touch screen display 16 of the information processing apparatus 1. The CPU 10 calculates the distance L_m between two strokes among the plurality of acquired strokes. When the distance L_m is shorter than the distance threshold β_L, the CPU 10 recognizes the two strokes as the same item. When the distance L_m is longer than or equal to the distance threshold β_L, the CPU 10 recognizes the two strokes as separate items. The CPU 10 changes the distance threshold β_L by input via the touch screen display 16. Thus, even if the CPU 10 performs the recognition of the item of two strokes against the user's intention, the user is allowed to easily change the distance threshold by operating the touch screen display 16. Thus, the editing program causes the CPU 10 to perform recognition of the item according to the user's intention for a plurality of strokes.

Further, the editing program of the present embodiment causes the CPU 10 to display a plurality of strokes, the threshold region, and the distance threshold slide bar 61 on the touch screen display 16 of the information processing apparatus 1. The threshold region is a region extending outward from an outer periphery (item frame) of the item region based on the distance threshold β_L, and is a region defined by a width of ½ of the distance threshold β_L from the outer periphery of the item region. The slider 611 of the distance threshold slide bar 61 is displaced to change the distance threshold β_L. The CPU 10 changes the distance threshold β_L based on the displacement operation of the slider 611. The user easily changes the distance threshold β_L by displacing the slider 611 displayed on the touch screen display 16.

Further, the editing program according to the present embodiment causes the CPU 10 to change the area of the threshold region and display the same in conjunction with the change in the distance threshold β_L based on the displacement operation of the slider 611. This allows the user to easily view change of the distance threshold β_L in the form of change of the threshold region. Since the area of the threshold region is changed in conjunction with the displacement operation of the slider 611, the user intuitively operates the distance threshold β_L while visually checking the area of the threshold region.

Further, the editing program of the present embodiment causes the CPU 10 to calculate the time difference t_m between input of two strokes inputted via the touch screen display 16. Further, the editing program causes the CPU 10 to change the time threshold β_t via the touch screen display 16. When the calculated distance L_m is shorter than the distance threshold β_L and the calculated time difference t_m is smaller than the time threshold β_t, the CPU 10 recognizes the two strokes as the same item. When the calculated distance L_m is longer than or equal to the distance threshold β_L, or when the distance L_m is shorter than the distance threshold β_L and the calculated time difference t_m is longer than or equal the time threshold β_t, the CPU 10 recognizes the two strokes as separate items. Thus, even if the CPU 10 executes the recognition of the item for two strokes against the user's intention, the user is allowed to easily change the time threshold β_t by operating the touch screen display 16. Thus, the editing program causes the CPU 10 to perform recognition of the item according to the user's intention for a plurality of strokes.

Further, the editing program of the present embodiment causes the CPU 10 to display a plurality of strokes, the threshold region, and the time threshold slide bar 62 on the touch screen display 16 of the information processing apparatus 1. The threshold region is a region extending outward from an outer periphery (item frame) of the item region based on the distance threshold β_L, and is a region defined by a width of β_L/2 (half of β_L) from the outer periphery of the item region. The item region is a region of an item recognized as the same item. The slider 621 of the time threshold slide bar 62 is displaced to change the time threshold β_t. The CPU 10 changes the time threshold β_t based on the displacement operation of the slider 621. The user easily changes the time threshold β_t by displacing the slider 621 displayed on the touch screen display 16.

Further, the editing program causes the CPU 10 to change the area of the item region and display the same in conjunction with the change in the time threshold β_t based on the displacement operation of the slider 621. This allows the user to easily view the change of the time threshold β_t in the form of change of the area of the item region.

In the above description, the touch screen display 16 is an example of "input operation interface" and "display" of the present disclosure. The slider 611 of the distance threshold slide bar 61 is an example of "first displacement operation interface" of the present disclosure. The slider 621 of the time threshold slide bar 62 is an example of "second displacement operation interface" of the present disclosure. S12 in FIG. 5 is an example of "acquisition process" of the present disclosure. S52 in FIG. 9 is an example of "distance calculation process" of the present disclosure. The processing of S53:YES and S56 is "same item recognition process" of the present disclosure. The processing of S53:NO and S57 is "separate item recognition process" of the present disclosure. The processing of S54 is an example of "time difference calculation process" of the present disclosure. The processing of S83 and S84 in FIG. 12 are an example of "distance threshold changing process" of the present disclosure. The processing of S82 and S92 are examples of "first display process" and "second display process" of the present disclosure. S85 is an example of "time threshold changing process" of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

For example, in the above embodiment, the change in the distance threshold β_L is performed by the displacement operation of the slider 611 of the distance threshold slide bar 61 displayed in the display region 50. However, the change in the distance threshold β_L may be performed by another method. Hereinafter, five modifications of method of changing the distance threshold β_L will be described with reference to FIGS. 20 to 25. These five modifications may be applied to changing the time threshold β_t.

Figure 20:
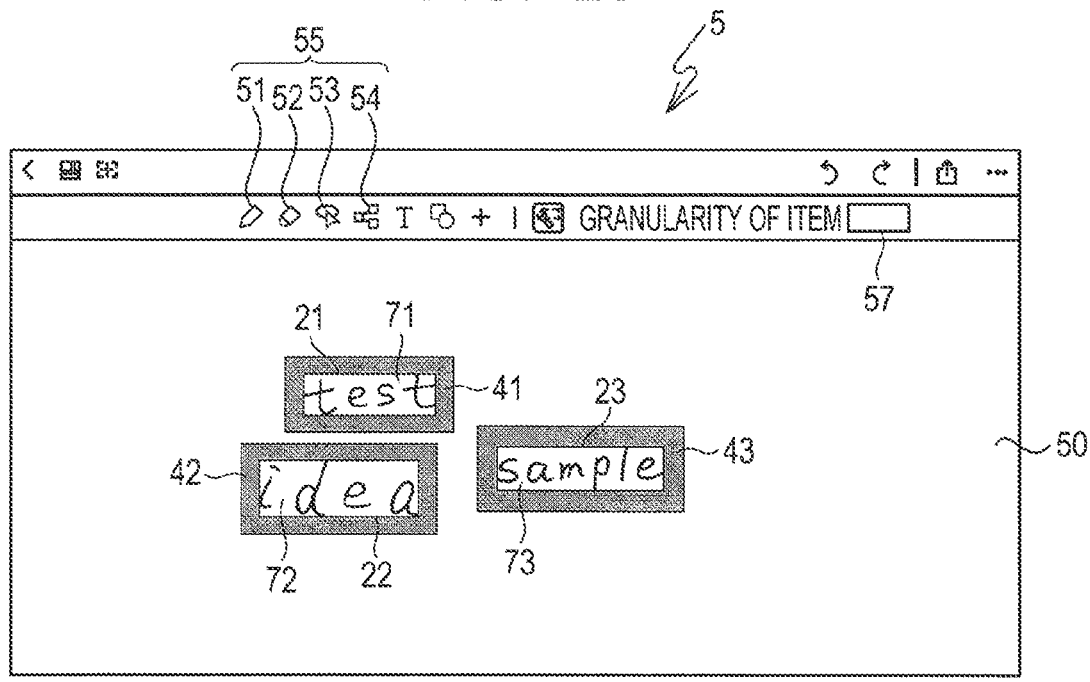
FIG. 20 is a diagram showing an editing window 5 in which an input field 57 is displayed.

A first modification will be described with reference to FIG. 20. In an upper portion of the editing window 5 of the first modification, an input field 57 for inputting a granularity of an item is displayed at the right side of the plurality of software buttons 55. The granularity of an item means the size of an item that is adjusted according to the distance threshold β_L. For example, the default value of the granularity is set to 100 and this corresponds to the default value of the distance threshold β_L. As the granularity increases with reference to 100, the distance threshold β_L increases, and as the granularity decreases, the distance threshold β_L decreases. As the granularity is increased, the items are combined with each other, and thus the number of items decreases. As the granularity is reduced, the items separate from each other, and thus the number of items increases. As in the first modification, the distance threshold β_L may be changed by inputting a numerical value into the input field 57.

Figure 21:
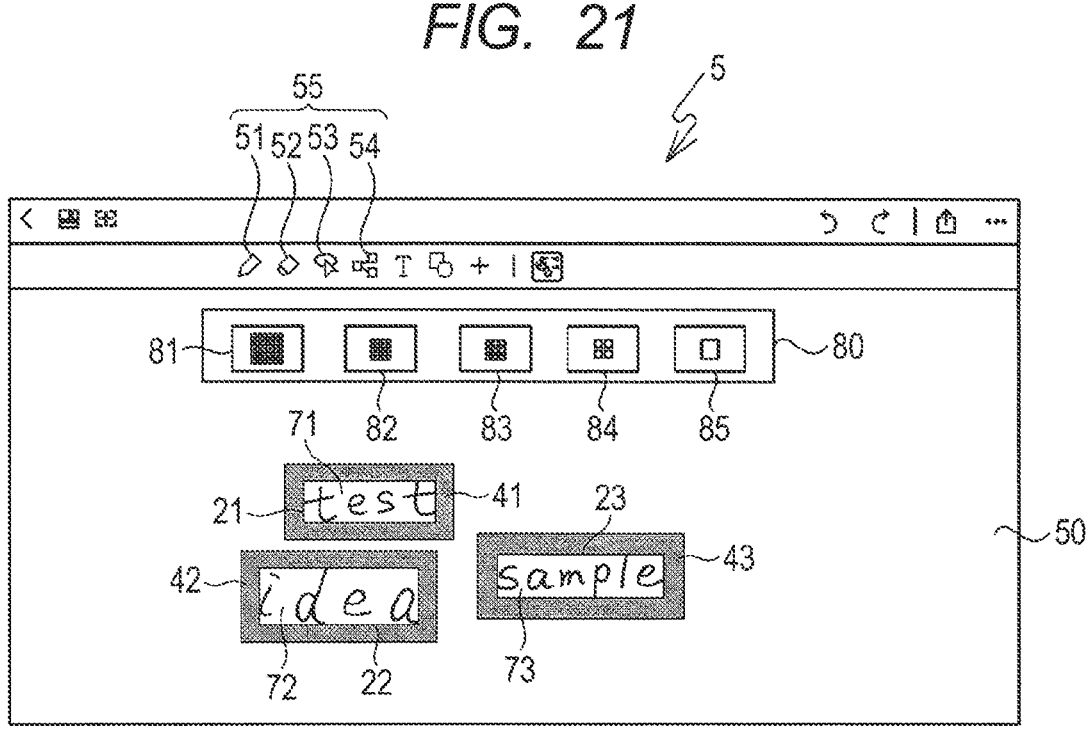
FIG. 21 is a diagram showing an editing window 5 in which a distance threshold selection bar 80 is displayed.

A second modification will be described with reference to FIG. 21. A distance threshold selection bar 80 is displayed in an upper portion of the display region 50 of the editing window 5 of the second modification. The distance threshold selection bar 80 has five selection buttons 81 to 85 side by side such that the distance threshold β_L is selectable in five steps. For example, it may be configured that the distance threshold β_L becomes larger from the selection button 81 toward the selection button 85 in a stepwise manner, and the selection button 83 in the center may be set as a default. As in the second modification, the distance threshold β_L may be selectively changed.

Figure 22:
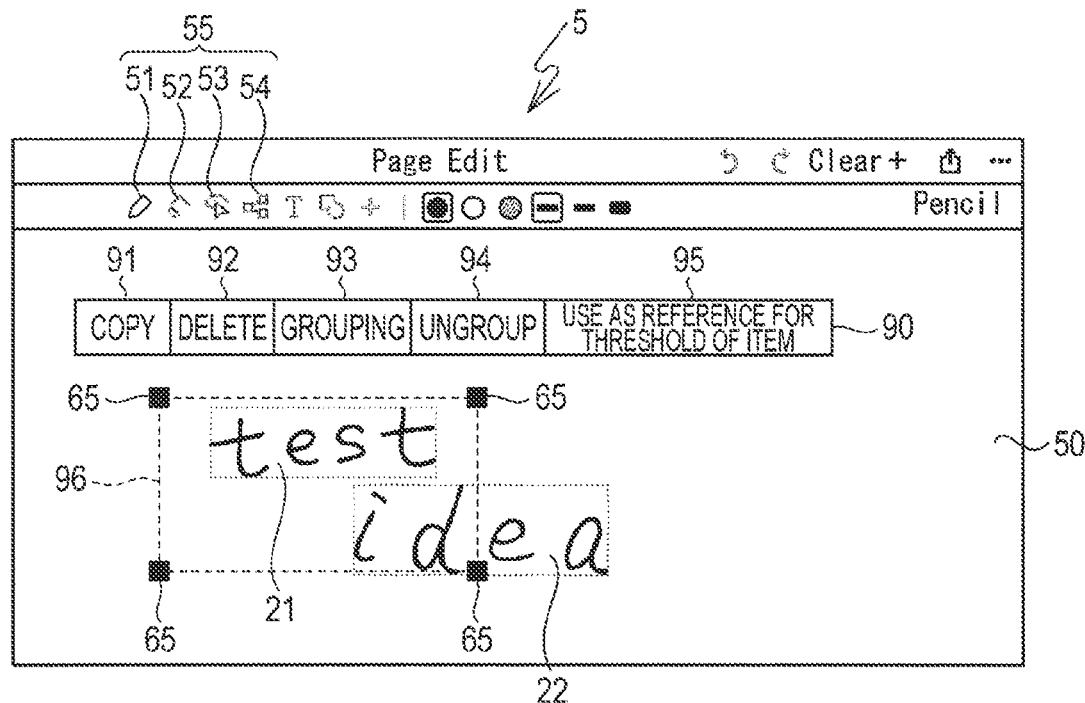
FIG. 22 is a diagram showing an editing window 5 in which a stroke selection bar 90 is displayed.

A third modification will be described with reference to FIG. 22. A stroke selection bar 90 is displayed in an upper portion of the display region 50 of the editing window 5 of the third modification. The stroke selection bar 90 includes, in order from the left side, a copy button 91, a delete button 92, a grouping button 93, an ungroup button 94, and an item determination button 95. The copy button 91 is pressed for copying an item. The delete button 92 is pressed for deleting an item. The grouping button 93 is pressed for grouping selected strokes. The ungroup button 94 is pressed for cancelling grouping. The item determination button 95 is pressed for specifying a range to be recognized as one item in a selection frame 96 displayed in the display region 50, and determining the range.

For example, when "test" of the item 21 and "id" in "idea" of the item 22 are to be recognized as one item in the display region 50, the user adjusts the range of the selection frame 96 by moving or expanding or contracting the selection frame 96. Rectangular marks 65 are displayed at four corners of the selection frame 96. By moving the positions of the rectangular marks 65, the range of the selection frame 96 is expanded and contracted. Then, by pressing the item determination button 95 in a state where the selection frame 96 is moved to a desired position, the distance threshold β_L is automatically changed such that a plurality of strokes selected in the selection frame 96 become one item. As in the third modification, a range of one item may be specified by the selection frame 96, and the distance threshold β_L may be automatically changed accordingly.

A fourth modification will be described with reference to FIG. 23. In an upper portion of the editing window 5 of the fourth modification, a granularity reduce button 97 and a granularity increase button 98 for adjusting the granularity of items are displayed on the right of the plurality of software buttons 55. Each time the granularity reduce button 97 is pressed, the granularity decreases stepwise. Each time the granularity increase button 98 is pressed, the granularity increases stepwise. As in the fourth modification, the distance threshold β_L may be changed stepwise by pressing the granularity reduce button 97 or the granularity increase button 98.

A fifth modification will be described with reference to FIGS. 24 and 25. In the fifth modification, as shown in FIG. 24, the distance between the item 21 and the item 22 is set to the distance threshold β_L by drawing a combining line 101 from the item 21 to the item 22. As a result, the distance threshold β_L increases, and the items 21 and 22 are combined with each other and become one item.

As shown in FIG. 25, an item 24 is divided into two items "test" and "idea", by drawing a division line 102 to break between "test" and "idea" in the item 24. Then, the distance between two divided items is set to the distance threshold β_L. As in the fifth modification, an item adjustment mode may be provided, and the distance threshold β_L may be automatically changed by connecting items or by drawing a division line on an item.

In addition, various modifications can be made to the present disclosure in addition to the above-described modifications. For example, as shown in FIG. 16A, the width of the threshold region 41 of the item 21 displayed in the display region 50 is ½ of the distance threshold β_L. Alternatively, the width of the threshold region 41 may be the distance threshold β_L. In this case, when the distance threshold β_L is increased, the item 21 is recognized as the same item as the other item 22, 23 at a time point when the threshold region 41 reaches the item region 72, 73 of the other item 22, 23.

In the above-described embodiment, it is determined whether two strokes are the same item or different items by using the distance threshold β_L and the time threshold β_t. Alternatively, it may be determined by using only the distance threshold β_L. In that case, the detailed process of FIG. 9 may be omitted.

As shown in FIG. 15, the CPU 10 continuously changes the distance threshold β_L and the time threshold β_t by horizontally displacing the slider 611, 621 of the distance threshold slide bar 61 and the time threshold slide bar 62. The direction in which the slider 611, 621 is displaced is not limited to the horizontal direction and may be a vertical direction or an oblique direction. Further, the slider 611, 621 may be rotated and displaced like a dial.

Further, a microcomputer, an ASIC (Application Specific Integrated Circuits), an FPGA (Field Programmable Gate Array), and so on may be used as a processor instead of the CPU 10.

What is claimed is:

1. A non-transitory computer-readable storage medium storing an editing program including a set of program instructions for an information processing apparatus comprising a processor, a memory, and a display, the set of program instructions, when executed by the processor, causing the information processing apparatus to perform:
    acquiring a plurality of strokes inputted by handwriting of a user to a display region of the display;
    calculating a distance between two strokes of the acquired plurality of strokes in the display region;
    based on determining that the calculated distance is shorter than a distance threshold, determining the two strokes correspond to the same item;
    based on determining that the calculated distance is longer than or equal to the distance threshold, determining the two strokes correspond to separate items; and
    changing the distance threshold based on user input to a first operation interface in the display region of the display.

2. The non-transitory computer-readable storage medium according to claim 1, wherein the set of program instructions, when executed by the processor, causes the information processing apparatus to further perform:
    controlling the display to display, in the display region, the plurality of strokes, a threshold region, and the first operation interface, the threshold region being obtained by adding the distance threshold to an item region of an item corresponding to the same item, the first operation interface being operated to be displaced for changing the distance threshold.

3. The non-transitory computer-readable storage medium according to claim 2, wherein the set of program instructions, when executed by the processor, causes the information processing apparatus to further perform:
    setting the item region, the item region being defined by a smallest rectangle surrounding the item; and
    setting the threshold region around the item region, a width of the threshold region being ½ of the distance threshold; and
    wherein the controlling the display includes changing the width of the threshold region based on changing the distance threshold.

4. The non-transitory computer-readable storage medium according to claim 2, wherein the controlling the display includes:
    changing an area of the threshold region based on changing the distance threshold, which is based on a displacement operation via the user input to the first operation interface, and displaying the changed threshold region.

5. The non-transitory computer-readable storage medium according to claim 1, wherein the set of program instructions, when executed by the processor, causes the information processing apparatus to further perform:
    calculating a time difference of inputs of the two strokes inputted by handwriting of the user to the display region of the display; and
    changing a time threshold by user input to a second operation interface in the display region of the display;
    wherein the determining the two strokes correspond to the same item includes:
        based on determining that the calculated distance is shorter than the distance threshold and that the calculated time difference is smaller than the time threshold, determining the two strokes correspond to the same item; and
    wherein the determining the two strokes correspond to separate items includes:
        based on determining that the calculated distance is longer than or equal to the distance threshold or based on determining that the calculated distance is shorter than the distance threshold and that the calculated time difference is larger than or equal to the time threshold, determining the two strokes correspond to the separate items.

6. The non-transitory computer-readable storage medium according to claim 5, wherein the set of program instructions, when executed by the processor, causes the information processing apparatus to further perform:
    controlling the display to display, in the display region, the plurality of strokes, a threshold region, the first operation interface, and a second operation interface, the threshold region being obtained by adding the distance threshold to an item region of an item corresponding to the same item, the second operation interface being operated to be displaced for changing the time threshold; and
    changing the time threshold based on user input to the second operation interface in the display region of the display.

7. The non-transitory computer-readable storage medium according to claim 6, wherein the controlling the display includes:
    controlling the display to further display, in the display region, the item region; and
    changing an area of the item region based on changing the time threshold, which is based on a displacement operation via the user input to the second operation interface, and displaying the changed item region.

8. The non-transitory computer-readable storage medium according to claim 1, wherein the set of program instructions, when executed by the processor, causes the information processing apparatus to further perform:
   acquiring a distance threshold from the memory, the distance threshold being a distance between strokes in the display region of the display, the distance threshold being used to determine whether a stroke inputted by handwriting corresponds to the same item or a separate item as another item previously inputted by handwriting.

9. An information processing apparatus comprising:
   a processor;
   a display including a display region; and
   memory storing instructions therein that, when executed by the processor, cause the information processing apparatus to:
   acquire a plurality of strokes inputted by handwriting of a user to a display region of the display;
   calculate a distance between two strokes of the acquired plurality of strokes in the display region;
   based on determining that the calculated distance is shorter than a distance threshold, determine the two strokes correspond to the same item;
   based on determining that the calculated distance is longer than or equal to the distance threshold, determine the two strokes correspond to separate items; and
   change the distance threshold based on user input to a first operation interface in the display region of the display.

10. The information processing apparatus according to claim 9, wherein the instructions, when executed by the processor, further cause the information processing apparatus to:
    control the display to display, in the display region, the plurality of strokes, a threshold region, and the first operation interface, the threshold region being obtained by adding the distance threshold to an item region of an item corresponding to the same item, the first operation interface being operated to be displaced for changing the distance threshold.

11. The information processing apparatus according to claim 10, wherein the instructions, when executed by the processor, further cause the information processing apparatus to:
    change an area of the threshold region based on changing the distance threshold, which is based on a displacement operation via the user input to the first operation interface, and display the changed threshold region.

12. The information processing apparatus according to claim 10, wherein the instructions, when executed by the processor, further cause the information processing apparatus to:
    set the item region, the item region being defined by a smallest rectangle surrounding the item;
    set the threshold region around the item region, a width of the threshold region being ½ of the distance threshold; and
    change the width of the threshold region based on changing the distance threshold.

13. The information processing apparatus according to claim 9, wherein the instructions, when executed by the processor, further cause the information processing apparatus to:
    calculate a time difference of inputs of the two strokes inputted by handwriting of the user to the display region of the display;
    change a time threshold by user input to a second operation interface in the display region of the display;
    based on determining that the calculated distance is shorter than the distance threshold and that the calculated time difference is smaller than the time threshold, determine the two strokes correspond to the same item; and
    based on determining that the calculated distance is longer than or equal to the distance threshold or based on determining that the calculated distance is shorter than the distance threshold and that the calculated time difference is larger than or equal to the time threshold, determine the two strokes correspond to the separate items.

14. The information processing apparatus according to claim 13, wherein the instructions, when executed by the processor, further cause the information processing apparatus to:
    control the display to display, in the display region, the plurality of strokes, a threshold region, and the first operation interface, and a second operation interface, the threshold region being obtained by adding the distance threshold to an item region of an item corresponding to the same item, the second operation interface being operated to be displaced for changing the time threshold; and
    change the time threshold based on user input to the second operation interface in the display region of the display.

15. The information processing apparatus according to claim 14, wherein the instructions, when executed by the processor, further cause the information processing apparatus to:
    control the display to further display, in the display region, the item region; and
    change an area of the item region based on changing the time threshold, which is based on a displacement operation via user input to the second operation interface, and displaying the changed item region.

16. The information processing apparatus according to claim 9, wherein the instructions, when executed by the processor, further cause the information processing apparatus to:
    acquire a distance threshold from the memory, the distance threshold being a distance between strokes in a display region of the display, the distance threshold being used to determine whether a stroke inputted by handwriting corresponds to the same item or a separate item as another item previously inputted by handwriting.

* * * * *